US012705182B2

(12) United States Patent
Kondapaneni et al.

(10) Patent No.: US 12,705,182 B2
(45) Date of Patent: Aug. 11, 2026

(54) PROCESSING CACHE EVICTIONS IN A DIRECTORY SNOOP FILTER WITH ECAM

(71) Applicant: Akeana, Inc., Santa Clara, CA (US)

(72) Inventors: Madhavi Kondapaneni, Cupertino, CA (US); Rabin Sugumar, Sunnyvale, CA (US)

(73) Assignee: Akeana, Inc., Santa Clara, CA (US)

( * ) Notice: Subject to any disclaimer, the term of this patent is extended or adjusted under 35 U.S.C. 154(b) by 0 days.

(21) Appl. No.: 19/059,355

(22) Filed: Feb. 21, 2025

(65) Prior Publication Data

US 2025/0272246 A1 Aug. 28, 2025

Related U.S. Application Data

(60) Provisional application No. 63/745,432, filed on Jan. 15, 2025, provisional application No. 63/735,937, filed on Dec. 19, 2024, provisional application No. 63/730,997, filed on Dec. 12, 2024, provisional application No. 63/719,841, filed on Nov. 13, 2024, provisional application No. 63/714,529, filed on Oct. 31, 2024, provisional application No. 63/702,192, filed on Oct. 2, 2024, provisional application No. 63/699,245, filed on Sep. 26, 2024, provisional application No. 63/691,351, filed on Sep. 6, 2024,
(Continued)

(51) Int. Cl.

| | |
|---|---|
| ***G06F 12/08*** | (2016.01) |
| ***G06F 12/0811*** | (2016.01) |
| ***G06F 12/0831*** | (2016.01) |
| ***G06F 12/0891*** | (2016.01) |

(52) U.S. Cl.
CPC ...... *G06F 12/0891* (2013.01); *G06F 12/0811* (2013.01); *G06F 12/0831* (2013.01)

(58) Field of Classification Search
CPC ............. G06F 12/0891; G06F 12/0811; G06F 12/0831
See application file for complete search history.

(56) References Cited

U.S. PATENT DOCUMENTS

| | | | |
|---|---|---|---|
| 6,934,809 | B2 | 8/2005 | Tremblay et al. |
| 7,506,105 | B2 | 3/2009 | Al-Sukhni et al. |
| 9,672,154 | B1 | 6/2017 | Hsu et al. |
| 9,830,097 | B2 | 11/2017 | Susarla et al. |
| 10,013,356 | B2 | 7/2018 | Chou |
| 10,031,851 | B2 | 7/2018 | Sundaram et al. |
| 10,671,394 | B2 | 6/2020 | Britto et al. |
| 10,929,948 | B2 | 2/2021 | Benthin et al. |
| 11,163,684 | B1 | 11/2021 | Gray et al. |
| 11,288,405 | B2 | 3/2022 | Belgarric et al. |

(Continued)

FOREIGN PATENT DOCUMENTS

| | | |
|---|---|---|
| WO | 2022117687 A1 | 6/2022 |

*Primary Examiner* — Jae U Yu
(74) *Attorney, Agent, or Firm* — Adams Intellex, PLC

(57) ABSTRACT

Techniques for maintaining cache coherency while sharing data among multiple processors are disclosed. Multiple coherent elements are arranged in an M×N mesh topology. An element can include a compute coherency block (CCB), and a coherency ordering agent (COA). The COAs include a directory snoop filter (DSF), an eviction content addressable memory (eCAM), a miss and snoop queue (MSQ), and a pipeline logic. The CCB and COA include functions for interfacing with a hierarchical cache and directory snoop filter (DSF). A CCB from within one of the multiple coherent elements issues a read request. The corresponding directory snoop filter (DSF) is inspected to determine if there is a slot (way) available for storing information pertaining to the read request. In the event that no eligible vacancies are present in the DSF, a multi-pass process for handling a capacity limit in a DSF is performed.

22 Claims, 12 Drawing Sheets

Related U.S. Application Data provisional application No. 63/690,822, filed on Sep. 5, 2024, provisional application No. 63/687,795, filed on Aug. 28, 2024, provisional application No. 63/679,685, filed on Aug. 6, 2024, provisional application No. 63/679,192, filed on Aug. 5, 2024, provisional application No. 63/653,402, filed on May 30, 2024, provisional application No. 63/641,045, filed on May 1, 2024, provisional application No. 63/640,921, filed on May 1, 2024, provisional application No. 63/570,281, filed on Mar. 27, 2024, provisional application No. 63/564,529, filed on Mar. 13, 2024, provisional application No. 63/563,492, filed on Mar. 11, 2024, provisional application No. 63/563,102, filed on Mar. 8, 2024, provisional application No. 63/556,951, filed on Feb. 23, 2024, provisional application No. 63/556,944, filed on Feb. 23, 2024.

(56) References Cited

U.S. PATENT DOCUMENTS

| | | | | |
|---|---|---|---|---|
| 11,385,896 | B2 | 7/2022 | Shulyak et al. | |
| 11,403,099 | B2 | 8/2022 | Cerny et al. | |
| 11,403,225 | B2 | 8/2022 | Zheng et al. | |
| 11,429,529 | B2 | 8/2022 | Hornung et al. | |
| 11,442,863 | B2 | 9/2022 | Shulyak et al. | |
| 11,474,130 | B2 | 10/2022 | Lentz et al. | |
| 11,486,911 | B2 | 11/2022 | Tuncer et al. | |
| 2016/0062889 | A1* | 3/2016 | Salisbury ............ | G06F 12/0831<br>711/146 |
| 2022/0004639 | A1 | 1/2022 | Yardi et al. | |
| 2022/0029780 | A1 | 1/2022 | Dafali | |
| 2022/0197657 | A1 | 6/2022 | Soundararajan et al. | |

* cited by examiner

PROCESSING CACHE EVICTIONS IN A DIRECTORY SNOOP FILTER WITH ECAM

RELATED APPLICATIONS

This application claims the benefit of U.S. provisional patent applications "Processing Cache Evictions In A Directory Snoop Filter With ECAM" Ser. No. 63/556,944, filed Feb. 23, 2024, "System Time Clock Synchronization On An SOC With LSB Sampling" Ser. No. 63/556,951, filed Feb. 23, 2024, "Malicious Code Detection Based On Code Profiles Generated By External Agents" Ser. No. 63/563,102, filed Mar. 8, 2024, "Processor Error Detection With Assertion Registers" Ser. No. 63/563,492, filed Mar. 11, 2024, "Starvation Avoidance In An Out-Of-Order Processor" Ser. No. 63/564,529, filed Mar. 13, 2024, "Vector Operation Sequencing For Exception Handling" Ser. No. 63/570,281, filed Mar. 27, 2024, "Vector Length Determination For Fault-Only-First Loads With Out-Of-Order Micro-Operations" Ser. No. 63/640,921, filed May 1, 2024, "Circular Queue Management With Nondestructive Speculative Reads" Ser. No. 63/641,045, filed May 1, 2024, "Direct Data Transfer With Cache Line Owner Assignment" Ser. No. 63/653,402, filed May 30, 2024, "Weight-Stationary Matrix Multiply Accelerator With Tightly Coupled L2 Cache" Ser. No. 63/679,192, filed Aug. 5, 2024, "Non-Blocking Vector Instruction Dispatch With Micro-Operations" Ser. No. 63/679,685, filed Aug. 6, 2024, "Atomic Compare And Swap Using Micro-Operations" Ser. No. 63/687,795, filed Aug. 28, 2024, "Atomic Updating Of Page Table Entry Status Bits" Ser. No. 63/690,822, filed Sep. 5, 2024, "Adaptive SOC Routing With Distributed Quality-Of-Service Agents" Ser. No. 63/691,351, filed Sep. 6, 2024, "Communications Protocol Conversion Over A Mesh Interconnect" Ser. No. 63/699,245, filed Sep. 26, 2024, "Non-Blocking Unit Stride Vector Instruction Dispatch With Micro-Operations" Ser. No. 63/702,192, filed Oct. 2, 2024, "Non-Blocking Vector Instruction Dispatch With Micro-Element Operations" Ser. No. 63/714,529, filed Oct. 31, 2024, "Vector Floating-Point Flag Update With Micro-Operations" Ser. No. 63/719,841, filed Nov. 13, 2024, "Shadow Stack Management With Micro-Operations" Ser. No. 63/730,997, filed Dec. 12, 2024, "Systolic Array Matrix-Multiply Accelerator With Row Tail Accumulation" Ser. No. 63/735,937, filed Dec. 19, 2024, and "Non-Flushing Vector Micro-Operations With VSET" Ser. No. 63/745,432, filed Jan. 15, 2025.

Each of the foregoing applications is hereby incorporated by reference in its entirety.

FIELD OF ART

This application relates generally to computer processors, and more particularly to processing cache evictions in a directory snoop filter with eCAM.

BACKGROUND

Processor efficiency plays an important role in the performance and overall functionality of modern products across various industries. Efficient processors contribute to faster and more responsive performance. This is critical for applications that demand quick response times, such as gaming, real-time processing, and high-performance computing tasks. Moreover, efficient processors consume less power, contributing to longer battery life in portable devices and reducing energy costs in data centers. This is particularly important for mobile devices, laptops, and any products aiming for sustainability and reduced environmental impact. A related benefit of efficient processors is that they generate less heat during operation. Reduced heat generation is essential for devices where thermal management is a concern, such as for laptops, servers, and embedded systems. Lower heat generation helps maintain stable operating conditions and prevents overheating. Furthermore, efficient processors enable sleek and compact designs for various products. This is especially vital for mobile devices, wearables, and IoT (Internet of Things) devices where size and weight considerations are important. Efficient processors contribute to cost savings in terms of both manufacturing and operational expenses. Additionally, lower power consumption reduces electricity costs, and the ability to use smaller cooling solutions can lead to cost savings in device manufacturing.

Main categories of processors include Complex Instruction Set Computer (CISC) types and Reduced Instruction Set Computer (RISC) types. In a CISC processor, one instruction may execute several operations. The operations can include memory storage, loading from memory, an arithmetic operation, and so on. In contrast, in a RISC processor, the instruction sets tend to be smaller than the instruction sets of CISC processors, and may be executed in a pipelined manner, having pipeline stages that may include fetch, decode, and execute. Each of these pipeline stages may take one clock cycle, and thus, the pipelined operation can allow RISC processors to operate on more than one instruction per clock cycle.

Integrated circuits (ICs) such as processors may be designed using a Hardware Description Language (HDL). Examples of such languages can include Verilog, VHDL, etc. HDLs enable the description of behavioral, register transfer, gate, and switch level logic. This provides designers with the ability to define levels in detail. Behavioral level logic allows for a set of instructions executed sequentially, while register transfer level logic allows for the transfer of data between registers, driven by an explicit clock and gate level logic. The HDL can be used to create text models that describe or express logic circuits. The models can be processed by a synthesis program, followed by a simulation program to test the logic design. Part of the process may include Register Level Transfer (RTL) abstractions that define the synthesizable data that is fed into a logic synthesis tool which in turn creates the gate-level abstraction of the design that is used for downstream implementation operations.

The efficiency of a processor is a critical factor influencing the performance, power consumption, and overall user experience of modern products. As technology continues to advance, there is a growing emphasis on developing processors that strike a balance between high performance and energy efficiency to meet the diverse needs of various applications and industries.

SUMMARY

Disclosed embodiments address the aforementioned cache coherency issues by providing techniques for processing cache evictions in a directory snoop filter with eviction content addressable memory (eCAM). In one or more embodiments, multiple coherent elements are arranged in an M×N mesh topology. Each element can include a compute coherency block (CCB) and a coherency ordering agent (COA). A CCB from within one of the multiple coherent elements can issue a read request. The corresponding directory snoop filter (DSF) is inspected to determine if there is a slot (way) available for storing information pertaining to the read request. In the event that no eligible vacancies are present in the DSF, the disclosed embodiments implement a method for handling a capacity miss in a DSF. The method can include a multi-pass sequence for accommodating the read request. The read request can be saved in a miss and snoop queue (MSQ). In embodiments, the first pass comprises initiating a read request and selecting a cache line for eviction. The selected cache line includes an index and a selected way that are stored in an entry within an eviction content addressable memory (eCAM). In embodiments, the second pass comprises arbitrating for the pipeline logic and sending the entry from the eCAM to the pipeline logic. In embodiments, the third pass includes mediating, by the MSQ, for the pipeline logic, and starting, by the COA, the read request, where the read request is handled coherently.

Techniques for maintaining cache coherency while sharing data among multiple processors are disclosed. Multiple coherent elements are arranged in an M×N mesh topology. An element can include a compute coherency block (CCB), and a coherency ordering agent (COA). The COAs include a directory snoop filter (DSF), an eviction content addressable memory (eCAM), a miss and snoop queue (MSQ), and a pipeline logic. The CCB and COA include functions for interfacing with a hierarchical cache and directory snoop filter (DSF). A CCB from within one of the multiple coherent elements issues a read request. The corresponding directory snoop filter (DSF) is inspected to determine if there is a slot (way) available for storing information pertaining to the read request. In the event that no eligible vacancies are present in the DSF, a multi-pass process for handling a capacity limit in a DSF is performed.

Disclosed embodiments provide a processor-implemented method for sharing data comprising: accessing a system-on-a-chip (SOC), wherein the SOC includes one or more compute coherency blocks (CCBs) and one or more coherency ordering agents (COAs), wherein a first COA within the one or more COAs comprises a directory snoop filter (DSF), an eviction content addressable memory (eCAM), a miss and snoop queue (MSQ), and a pipeline logic, wherein the DSF comprises N ways; initiating, by a first CCB in the one or more CCBs, a read request to a first address, wherein the first address includes a first index, wherein the read request misses in the DSF, and wherein the DSF is occupied with a valid data at each way of the N ways corresponding to the first index; selecting, by the DSF, a cache line for eviction, wherein the cache line includes the first index and a selected way within the N ways, wherein the first index and the selected way are stored in an entry within one or more entries of the eCAM; saving the read request from the first CCB in the MSQ; arbitrating, by the eCAM, for the pipeline logic within the COA, wherein the arbitrating includes selecting, by the eCAM, the entry to send to the pipeline logic; sending, by the eCAM, to the pipeline logic, the entry, wherein the sending causes a cache line associated with the first index to be evicted from the DSF, wherein the cache line is associated with a second address, wherein the sending includes writing, to the eCAM, by the DSF, the second address, wherein the second address overwrites the entry in the eCAM, and wherein the sending includes generating, by the pipeline logic, a snoop of the second address; mediating, by the MSQ, for the pipeline logic within the COA, wherein the mediating includes replaying, to the pipeline logic, by the MSQ, the read request to the first address; and starting, by the COA, the read request to the first address, wherein the read request to the first address is handled coherently. In embodiments, the replaying includes searching the DSF for the first address, wherein the searching produces a miss, and wherein the DSF saves information corresponding to the first address at a location, in the DSF, previously occupied by the second address. Some embodiments comprise holding another request to the first address from the one or more CCBs, wherein the holding is based on the second address that was written into the eCAM. Some embodiments comprise saving, to an input FIFO within the COA, the another request to the first address. Some embodiments comprise awakening the another request, wherein the awakening is based on deleting the second address that was written to the eCAM.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
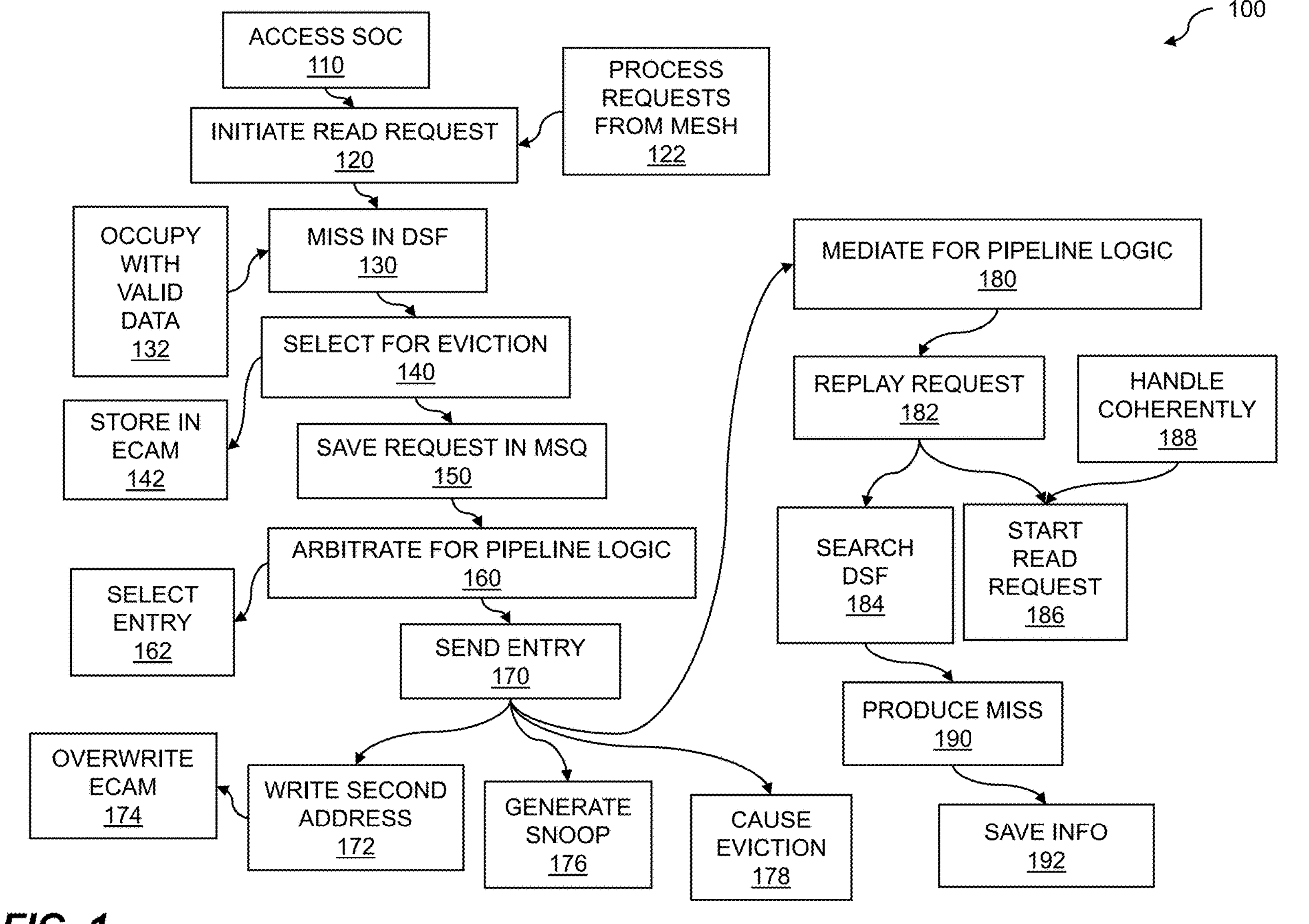
FIG. 1 is a flow diagram for processing cache evictions in a directory snoop filter with eviction content addressable memory (eCAM).

Processors are found in devices that play a role in nearly every aspect of daily life. The processors enable the devices within which the processors are located to execute a wide variety of applications. The applications include telephony, messaging, data processing, patient monitoring, vehicle access and operation control, etc. There are various types of processors, including mesh processors. Mesh processors use a mesh network to interconnect cores. In this approach, each processing core is connected to multiple neighboring cores, creating a mesh-like structure. Data travels through the shortest path to its destination, reducing latency. In particular, the mesh topology helps in reducing data transfer latency and improves overall bandwidth. With multiple pathways available for communication, data can be routed more efficiently, reducing potential bottlenecks. Furthermore, mesh processors can offer improved fault tolerance. If one pathway or core fails, data can often be rerouted through alternate paths, reducing the impact of a single point of failure. The improved fault tolerance can promote the stability and reliability of the processor. In critical systems such as those used in healthcare, aviation, finance, and infrastructure, maintaining operation despite faults is essential to prevent system failures that could have catastrophic consequences. In many scenarios, interruption or downtime is costly. Fault tolerance helps maintain system operations even in the presence of faults, reducing downtime and ensuring continuity of service. Additionally, mesh architectures are highly scalable. As updated designs include more cores, they can be integrated into the mesh network, allowing for efficient communication between the cores while creating processors that have more capabilities.

Another factor that plays a role in the performance of computing systems is the cache hierarchy. An efficient cache hierarchy within a computer system can provide significant performance improvements. Caches are faster than main memory. An efficient cache hierarchy ensures that frequently accessed data is readily available in the fastest (closest to the processor) and smallest cache levels, reducing the time taken to access data and instructions. This enhances the overall system performance. By placing frequently used data closer to the processor, a good cache hierarchy helps in reducing memory access latency. This means that the processor spends less time waiting for data, which can otherwise cause significant delays in program execution. Moreover, caches can help reduce power consumption and improve energy efficiency by minimizing the need to access the larger, slower main memory. Accessing the cache often consumes less power than accessing the main memory, leading to overall energy savings in the system. Furthermore, by storing frequently accessed data closer to the processor, a good cache hierarchy minimizes the amount of data that needs to be fetched from the slower main memory. This reduces the memory traffic and alleviates the memory bus congestion, thus enhancing overall system efficiency.

During processor execution, the contents of portions or blocks of a shared or common memory can be moved to local cache memory. The move to local cache memory can enable a significant boost to processor performance. The local cache memory is smaller and faster, and is located closer to an element that processes data, than is the shared memory. The element can include a coherent tile, where a coherent tile can include a processor, cache management elements, memory, and so on. A processor can include multiple coherent tiles arranged in a mesh (grid) topology. The local cache can be shared between coherent tiles, enabling local data exchange between the coherent tiles. The local cache can enable the sharing of data between and among coherent elements, where the elements can be located within an M×N mesh topology. The use of local cache memory is beneficial computationally because cache use takes advantage of "locality" of instructions and data typically present in application code as the code is executed. Coupling the cache memory to hierarchical tiles drastically reduces memory access times because of the adjacency of the instructions and the data. A hierarchical tile does not need to send a request across a common bus, across a crossbar switch, through buffers, and so on to access the instructions and data in a shared memory such as a shared system memory. Similarly, the coherent tile does not experience the delays associated with the shared bus, buffers, crossbar switch, etc.

A cache memory can be accessed by one, some, or all of a plurality of coherent tiles within the mesh topology. The access can be accomplished without having to access the slower common memory, thereby reducing access time and increasing processing speed. When a memory access operation is requested by a coherent tile, the coherent tile issues a snoop operation. The snoop operation indicates that the initiating coherent tile intends to access a portion or block of shared memory. The snoop operation is used to notify other coherent tiles within the mesh that the contents of the shared memory are to be read or written. A snoop operation associated with a write operation includes an invalidating snoop operation. Specifically, the write operation invalidates the contents of the cache by making the contents different from the contents of the shared memory. Thus, the use of smaller cache memory dictates that new cache lines must be brought into the cache memory to replace no-longer-needed cache lines (called a cache miss, which requires a cache line fill), and that existing cache lines in the cache memory that are no longer synchronized (coherent) must be evicted and managed across all caches and the common memory. The evicting cache lines and filling cache lines are accomplished using cache management techniques.

Cache coherency is a crucial aspect of multiprocessor systems where each processor has its own cache. Cache coherency ensures that all processors in the system have a consistent view of shared memory, preventing data inconsistencies and errors. Without coherency, one processor's modifications might not be visible to other processors, leading to data inconsistencies and errors. In parallel programming, where multiple threads or processes execute concurrently, maintaining cache coherency is essential for the correctness of the program. Coherency mechanisms ensure that the order of memory operations is preserved, preventing unexpected behavior in parallel execution. Coherency ensures that processors always have up-to-date and consistent copies of shared data. Without coherency, a processor might work with stale data from its cache, leading to incorrect computations and unpredictable behavior. Thus, maintaining cache coherency is very important for proper and efficient operation of processors. Cache coherency can represent a tradeoff involving performance and complexity. Without any caching at all, the complexity of managing copies of data is reduced, but performance suffers. When multiple levels of caching are used, performance gains can be achieved, but there can be additional complexity and/or overhead to manage copies of data located in cache memory.

Communication between individual cores of a multicore processor is an important component of implementing programs and applications that can take advantage of the parallelism that such processors provide. Various cores within a multicore processor can be assigned to handle individual tasks, and/or multiple cores can work together on the same task, dividing work as needed. For both of the aforementioned scenarios, a core is often required to take ownership of a cache or a portion of a cache, and to read, write, and/or modify the contents of the cache. While caches can improve performance, they can also add overhead for setup, management, and maintaining coherency. As an example, if one core of a multicore processor has updated a shared data item in its cache, other cores attempting to read the same data should also receive the most up-to-date copy of the data. This ensures that all processors observe a consistent view of the shared data. The overhead for maintaining the coherency can take away from the theoretical performance gains of using cache.

Techniques for processing cache evictions in a directory snoop filter with eviction content addressable memory (eCAM) are disclosed. Multiple coherent elements are arranged in an M×N mesh topology. Each element can include a compute coherency block (CCB) and a coherency ordering agent (COA). The CCB can include functions for interfacing with a hierarchical cache, and issuing read requests that may be sent out on a bus in a mesh topology.

The COA can include functions for interfacing with a directory snoop filter (DSF), as well as a last level cache (LLC). The DSF can include multiple presence vectors, where each presence vector includes a field of bits that includes an owner identifier, owner valid bit, and/or other data to indicate ownership and/or sharing of particular cache data. Thus, the DSF plays a role in snoops that can identify cache data that needs to be flushed for maintaining cache coherency.

In embodiments, a DSF includes multiple presence vectors, where each presence vector includes a field of bits that includes an owner identifier, owner valid bit, and/or other data to indicate ownership and/or sharing of a particular data cache. However, to avoid a very wide DSF, the DSF can have a different number of ways than the CCB(s). If the DSF is too wide, timing and area problems can result in the physical implementation of the DSF. These problems can adversely affect reliability and/or power consumption, among other factors. With the DSF having a different number of ways than the CCBs, there exists an opportunity for a capacity miss in the DSF cache. The DSF is first searched for an invalid (available) cache line in the slot (way) that matched the index of the address that is associated with a current read request. However, if no available slot exists, a DSF capacity eviction is performed. Disclosed embodiments provide a technique for performing a DSF capacity eviction. By supporting an efficient DSF capacity eviction process, disclosed embodiments can maintain the performance benefits that are achieved with a cache hierarchy, while eliminating timing issues that would result from a larger DSF. Further, disclosed embodiments can save considerable hardware, such as latches, from needing to be implemented in each stage of the COA pipeline logic, thereby improving resource utilization, reducing energy consumption, and reducing gate count in an SOC.

A CCB from within one of the multiple coherent elements can issue a read request. The corresponding directory snoop filter (DSF) is inspected to determine if there is a slot (way) available for storing information pertaining to the read request. In the event that no eligible vacancies are present in the DSF, the disclosed embodiments implement a method for handling a capacity miss in a DSF. The method can include a multi-pass sequence for accommodating the read request. The read request can be saved in a miss and snoop queue (MSQ). In embodiments, the first pass comprises initiating a read request and selecting a cache line for eviction. The selected cache line includes an index and a selected way that are stored in an entry within an eviction content addressable memory (eCAM). In embodiments, the second pass comprises arbitrating for the pipeline logic and sending the entry from the eCAM to the pipeline logic. In embodiments, the third pass includes mediating, by the MSQ, for the pipeline logic, and starting, by the COA, the read request, where the read request is handled coherently.

FIG. 1 is a flow diagram for processing cache evictions in a directory snoop filter with eviction content addressable memory (eCAM). The flow 100 starts with accessing a System-on-Chip (SOC) 110. In one or more embodiments, the SOC can include a plurality of coherent elements, where the elements can be located within an M×N mesh topology. The elements can include multicore processors, bus interfaces, memory controllers, I/O devices, caches, switches, and the like. In embodiments, the coherent elements can support pipelined execution. The flow 100 continues with initiating a read request 120. The read request can include reading a memory location. The read request can be part of an instruction. The instruction can include an integer instruction, floating-point instruction, vector instruction, and/or other instruction type. The flow 100 can include processing requests from the mesh 122. The read request can be generated by a CCB within a coherent element of the M×N mesh topology. Thus, a corresponding DSF exists for each CCB within the SOC. To reduce traffic, each DSF can cover a particular address range. In this case, when a CCB issues a read request, it is possible that the DSF responsible for the address range that covers the read request is in a different coherent element than the coherent element containing the CCB that issued the read request. Communications can be sent to the SOC used to distribute such requests to the proper DSF. The communications can include packetized communications within the NOC.

The flow 100 can include processing a miss in the DSF 130. A "miss" indicates that the memory associated with the read request is not in the DSF, and thus must be read from main memory or another level within the cache hierarchy. In some cases, there is an available slot (way) in the DSF, and the DSF data corresponding to the read request can be loaded in the available slot. In embodiments, a slot is deemed available if its data is indicated as invalid. In some embodiments, an owner valid status may be used instead of, or in addition to, a valid bit. The flow 100 can include that the DSF is fully occupied with valid data 132. In the case where all data referred to in the DSF is valid, no available slot (way) exists for a new read request. In the case where no available slot (way) exists, disclosed embodiments perform a DSF eviction process to free an entry from the DSF to make room for the current read request. In the case where the DSF is fully occupied with valid data, the flow 100 can include selecting a slot (way) for eviction 140. In embodiments, the slot (way) that is freed can be selected via a pseudorandom process, a round robin process, a least recently used (LRU) algorithm, and/or another suitable technique.

The flow 100 includes storing, in the eCAM 142, eviction information pertaining to the DSF entry that is getting evicted. The information that is stored can include, but is not limited to, the index corresponding to the read request address, and the way within that index that is to be evicted. Thus, the location in the DSF of the entry that is to be evicted is recorded in the eCAM. The storing of the eviction information in the eCAM enables a multiple pass process. The flow 100 can include saving the read request in a miss and snoop queue (MSQ) 150. In one or more embodiments, the read request address is stored in the miss and snoop queue (MSQ). The information in the MSQ and eCAM are used in one or more subsequent passes to complete the DSF eviction and associated read request.

The flow 100 further includes arbitrating for pipeline logic 160. The arbitrating can include one or more of various arbitration techniques. In one or more embodiments, the arbitrating is performed as a round robin arbitration process. Other embodiments may utilize token passing arbitration, reservation-based arbitration, source-initiated arbitration, and/or some other arbitration type. The flow 100 can further include selecting an entry in the eCAM 162 that is to be sent to the pipeline logic. In practice, the eCAM can store multiple entries. In one or more embodiments, the eCAM can store 16 entries, 32 entries, 64 entries, or some other number of entries, enabling multiple DSF evictions to be processed concurrently. When more than one DSF eviction is in process, the eCAM can select any of its entries to process a specific eviction. The selecting can be based on a least-recently-used algorithm (LRU), a pseudorandom algorithm, a round-robin algorithm, or another algorithm. Thus, in embodiments, the arbitrating includes a third address that was previously stored in the eCAM. The flow 100 further includes sending the entry 170 to the pipeline logic. Sending the entry within the eCAM to the pipeline logic can cause the elements that own cache lines, as identified via DSF entries, to flush dirty data, which can include writing cached data to main memory and/or various levels within a hierarchical cache to maintain cache coherency. These elements can include one or more processors in the SOC.

The information in the eCAM is provided to the pipeline logic, which results in one or more operations. The operations include generating a snoop 176. The snoop is generated for a second address. The second address can correspond to the entry in the DSF that was selected for eviction at 140. The snoop is used to identify a coherent element, such as a processor, that is an owner for the second address. The flow 100 further includes writing the second address 172. The writing of the second address can include writing the second address to main memory and/or one or more levels of a hierarchical cache. The flow 100 further includes overwriting the eCAM 174. The overwriting of the eCAM can include overwriting the entry that was stored in the eCAM at 142 with the second address value. The presence of the second address value in the eCAM can be used as criteria to block future accesses to the second address until the multiple pass eviction process completes. The flow 100 includes causing the eviction 178. The eviction can include changing the state of one or more bits within an entry in the DSF to indicate that the data and/or owner is invalid. The invalidity of the data and/or owner within a row within the DSF can be used as an indication that the row is now available to be overwritten with new data pertaining to the read request initiated.

The flow 100 further includes mediating for pipeline logic 180. The mediating can include giving the MSQ access to the pipeline logic. The mediating can comprise an additional arbitration for the pipeline logic. The flow 100 further includes replaying the request 182. The replaying of the request can include replaying the read request that was initiated at 120 and saved in the MSQ at 150. At this point in the eviction process, the entry in the DSF that was selected for eviction at 140 has been invalidated (as part of the eviction at 178), and accordingly, the flow 100 can include handling the read request coherently 188. That is, the replayed read request (182) can proceed to completion, utilizing the entry in the DSF that was made available as part of the eviction process. The flow 100 continues with starting the read request 186. The starting of the read request can be performed by the COA. The flow 100 can further include searching the DSF 184. The flow 100 further includes producing a miss 190. This is the same miss that was identified at 130, but the difference now is that, with a slot (way) now available in the DSF (due to the eviction at 178), the flow 100 can continue with saving the information 192. The saving of information can include writing an entry into the DSF in the slot that was freed due to the eviction at 178. The saved information can include an index, a valid bit, a presence vector, an owner id, an owner valid bit, and/or other information for maintaining coherency.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
FIG. 2 is a flow diagram for enabling another request.
Figure 2:
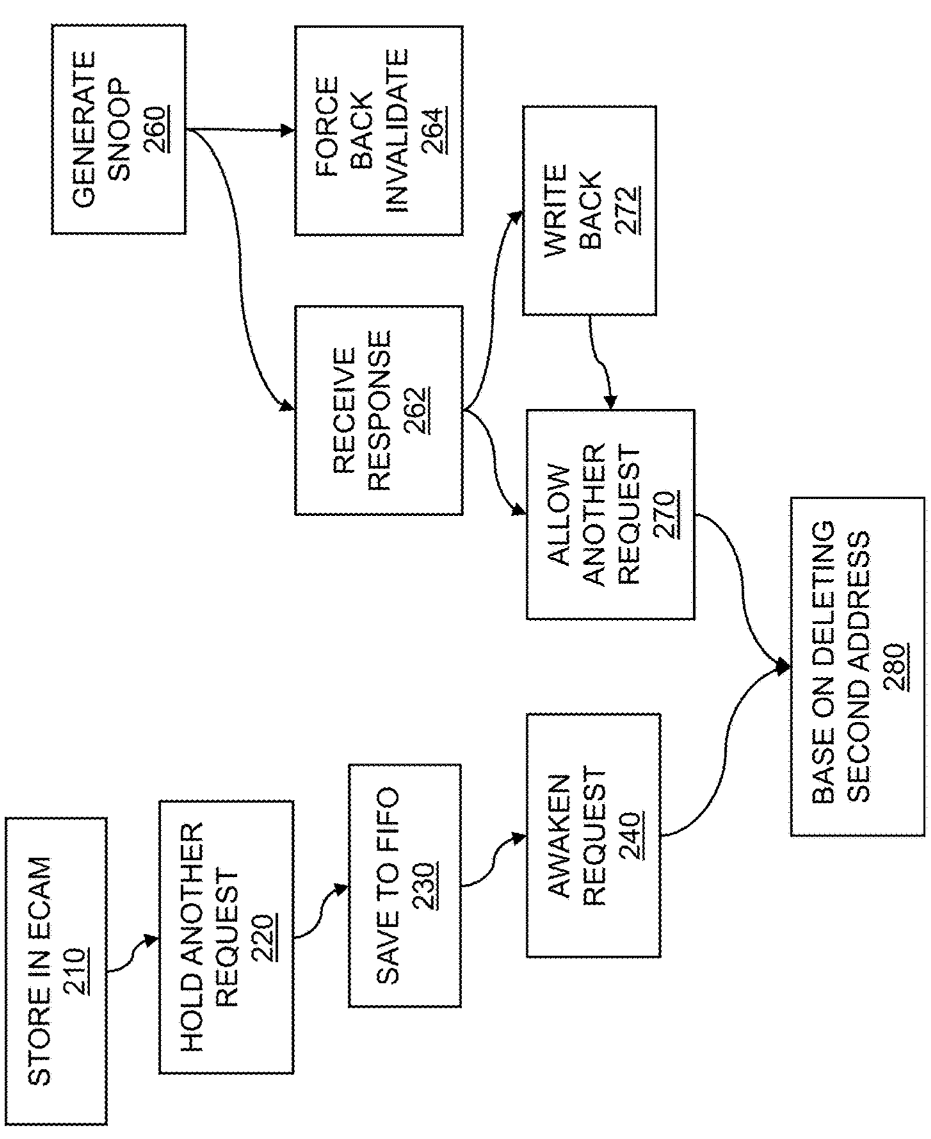

FIG. 2 is a flow diagram for enabling another request. The flow 200 can include storing information in the eCAM 210. The storing of information can include storing the address value pertaining to the DSF entry that is to be evicted, similar to the description of 174 in FIG. 1. In embodiments, a purpose of storing the address value in the eCAM is to serve as a criterion for deferring (holding) subsequent access requests for an address in the process of being stored in a DSF after a capacity miss. Referring again to FIG. 1, the first address can be the address associated with the read request at 120, and the second address can be the address written at 172. Accordingly, with the second address stored in eCAM at 210, the flow 200 continues with holding another request 220. That is, any subsequent access for the first address is deferred. The flow 200 can include saving the subsequent access to a FIFO 230. In one or more embodiments, the FIFO can be part of the COA where the corresponding DSF resides. The second address that was stored in eCAM 210 can be deleted once the eviction process completes. The deletion of the second address in the eCAM can cause a processor within a CCB in the SOC that is an owner of the cache line associated with the second address to flush any dirty data to main memory and/or one or more levels within a hierarchical cache. The flow 200 can include awakening the request 240 that was held at 220. The flow 200 can further include basing the awakening on deleting the second address 280. That is, the awakening of a previously held request can be based on deleting the second address (the address that was stored in eCAM at 210). In one or more embodiments, the deleting of the second address can include entering a NULL value into an eCAM entry. Alternatively, a predetermined value can signify an empty slot in the eCAM. In one or more embodiments, the deleting of the second address is performed by the COA once it determines that any dirty data associated with the second address has been written out to main memory and/or additional levels within a hierarchical cache.

The flow 200 can include generating a snoop 260. The snoop can be a snoop of the second address. The snooping of the second address can initiate the process of writing any dirty data, by an owner of a cache line associated with the second address to main memory and/or one or more levels within a hierarchical cache. The flow 200 can include receiving a response 262. The response can be received from one or more CCBs that are sharers of data corresponding to the second address. The flow 200 can further include forcing a back invalidate 264. That is, the snoop can force one or more sharers of a cache line associated with the second address to back invalidate the shared cache line corresponding to the second address. The flow 200 can further include performing a writeback 272. The writeback results in a memory update, such that the main memory now contains the dirty data that was written by the owner of the cache line associated with the second address. Thus, embodiments can include writing back, by the one or more CCBs, a dirty cache line corresponding to the second address. That is, in embodiments, the snoop causes an owner of a dirty cache line associated with the second address to perform a writeback to memory. Once the multiple pass eviction process completes, the flow 200 can allow another request 270. The allowing of another request can be based on deleting the second address 280.

Disclosed embodiments can perform an operation that includes processing a read request. The processing of the read request can include checking if the address associated with the read request is already represented in a DSF within the mesh topology. If the read request is not already represented in a DSF, it results in a DSF miss. If there is an available slot in the DSF that maps to the address of the read request, then the available slot is used for the read request, and subsequent read requests can utilize the DSF to decrease latency in performing the read request. However, if there is no available slot in the DSF that maps to the address of the read request, then disclosed embodiments perform a multiple pass operation that evicts an entry in the DSF; performs any needed coherency operations such as writebacks, cache flushing, and the like; and then performs a replay of the request (e.g., 182 of FIG. 1) to effectively reissue the read request during a condition where an available slot in the DSF exists. Additionally, while the multiple pass operation is in progress, disclosed embodiments hold subsequent read requests for the address until the multiple pass combination read request and DSF eviction operation completes. In this way, cache coherency is maintained in cases where the DSF is full. Moreover, utilizing the eCAM and MSQ to process DSF evictions can save considerable hardware, such as latches, from needing to be implemented in each stage of the COA pipeline logic, thereby improving resource utilization, reducing energy consumption, and reducing the gate count in an SOC.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
FIG. 3 is a block diagram illustrating a multicore processor.
Figure 3:
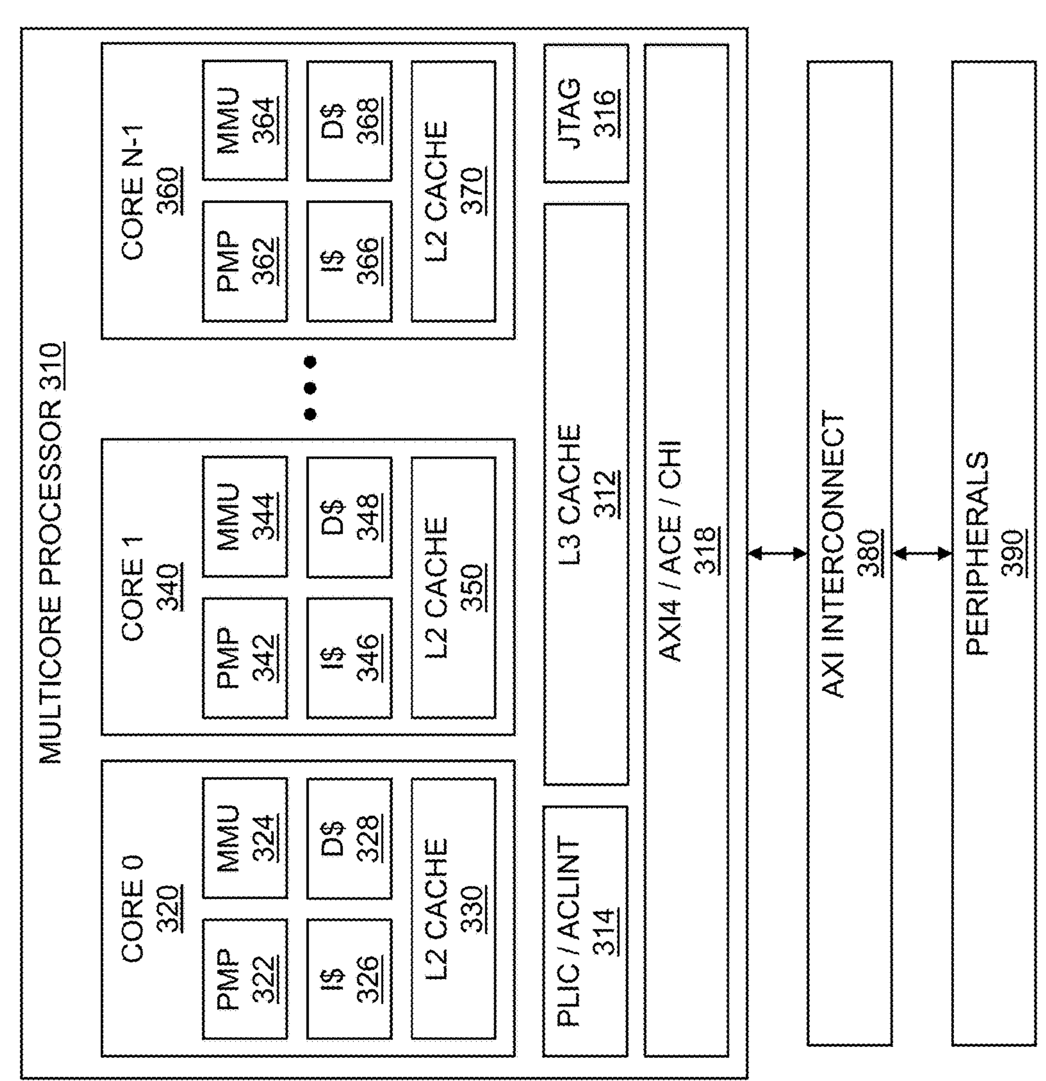

FIG. 3 is a block diagram 300 illustrating a multicore processor 310. The processor, such as a RISC-V™ processor, ARM processor, or other suitable processor type, can include a variety of elements. The elements can include processor cores, one or more caches, memory protection and management units, local storage, and so on. The elements of the multicore processor can further include one or more of a private cache, a test interface such as a joint test action group (JTAG) test interface, one or more interfaces to a network such as a network-on-chip, shared memory, peripherals, and the like. The multicore processor is enabled by coherency management using distributed snoop. Snoop requests are ordered in a two-dimensional matrix, wherein the two-dimensional matrix is extensible along each axis of the two-dimensional matrix. Snoop responses are mapped to a first-in first-out (FIFO) mapping queue, wherein each snoop response corresponds to a snoop request, and wherein each processor core of the plurality of processor cores is coupled to at least one FIFO mapping queue. A memory access operation is completed, based on a comparison of the snoop requests and the snoop responses.

The multicore processor 310 can comprise two or more processors, where the two or more processors can include homogeneous processors, heterogeneous processors, etc. In the block diagram, the multicore processor can include N processor cores such as core 0 320, core 1 340, core N−1 360, and so on. Each processor can comprise one or more elements. In embodiments, each core, including cores 0 through core N−1 can include a physical memory protection (PMP) element, such as PMP 322 for core 0; PMP 342 for core 1, and PMP 362 for core N−1. In a processor architecture such as the RISC-V™ architecture, a PMP can enable processor firmware to specify one or more regions of physical memory such as cache memory of the shared memory, and to control permissions to access the regions of physical memory. The cores can include a memory management unit (MMU) such as MMU 324 for core 0, MMU 344 for core 1, and MMU 364 for core N−1. The memory management units can translate virtual addresses used by software running on the cores to physical memory addresses with caches, the shared memory system, etc.

The processor cores associated with the multicore processor 310 can include caches such as instruction caches and data caches. The caches, which can comprise level 1 (L1) caches, can include an amount of storage such as 16 KB, 32 KB, and so on. The caches can include an instruction cache I$326 and a data cache D$328 associated with core 0; an instruction cache I$346 and a data cache D$348 associated with core 1; and an instruction cache I$366 and a data cache D$368 associated with core N−1. In addition to the level 1 instruction and data caches, each core can include a level 2 (L2) cache. The level 2 caches can include L2 cache 330 associated with core 0; L2 cache 350 associated with core 1; and L2 cache 370 associated with core N−1. The cores associated with the multicore processor 310 can include further components or elements. The further elements can include a level 3 (L3) cache 312. The level 3 cache, which can be larger than the level 1 instruction and data caches, and the level 2 caches associated with each core, can be shared among all of the cores. The further elements can be shared among the cores. In embodiments, the further elements can include a platform level interrupt controller (PLIC) 314. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 316. The JTAG can provide a boundary within the cores of the multicore processor. The JTAG can enable fault information to a high precision. The high-precision fault information can be critical to rapid fault detection and repair.

The multicore processor 310 can include one or more interface elements 318. The interface elements can support standard processor interfaces including an Advanced eXtensible Interface (AXI™) such as AXI4™, an ARM™ Advanced eXtensible Interface (AXI™) Coherence Extensions (ACE™) interface, an Advanced Microcontroller Bus Architecture (AMBA™) Coherence Hub Interface (CHI™), etc. In the block diagram 300, the interface elements can be coupled to the interconnect. The interconnect can include a bus, a network, and so on. The interconnect can include an AXI™ interconnect 380. In embodiments, the network can include network-on-chip functionality. The AXI™ interconnect can be used to connect memory-mapped "master" or boss devices to one or more "slave" or worker devices. In the block diagram 300, the AXI interconnect can provide connectivity between the multicore processor 310 and one or more peripherals 390. The one or more peripherals can include storage devices, networking devices, and so on. The peripherals can enable communication using the AXI™ interconnect by supporting standards such as AMBA™ version 4, among other standards.

Figure 4:
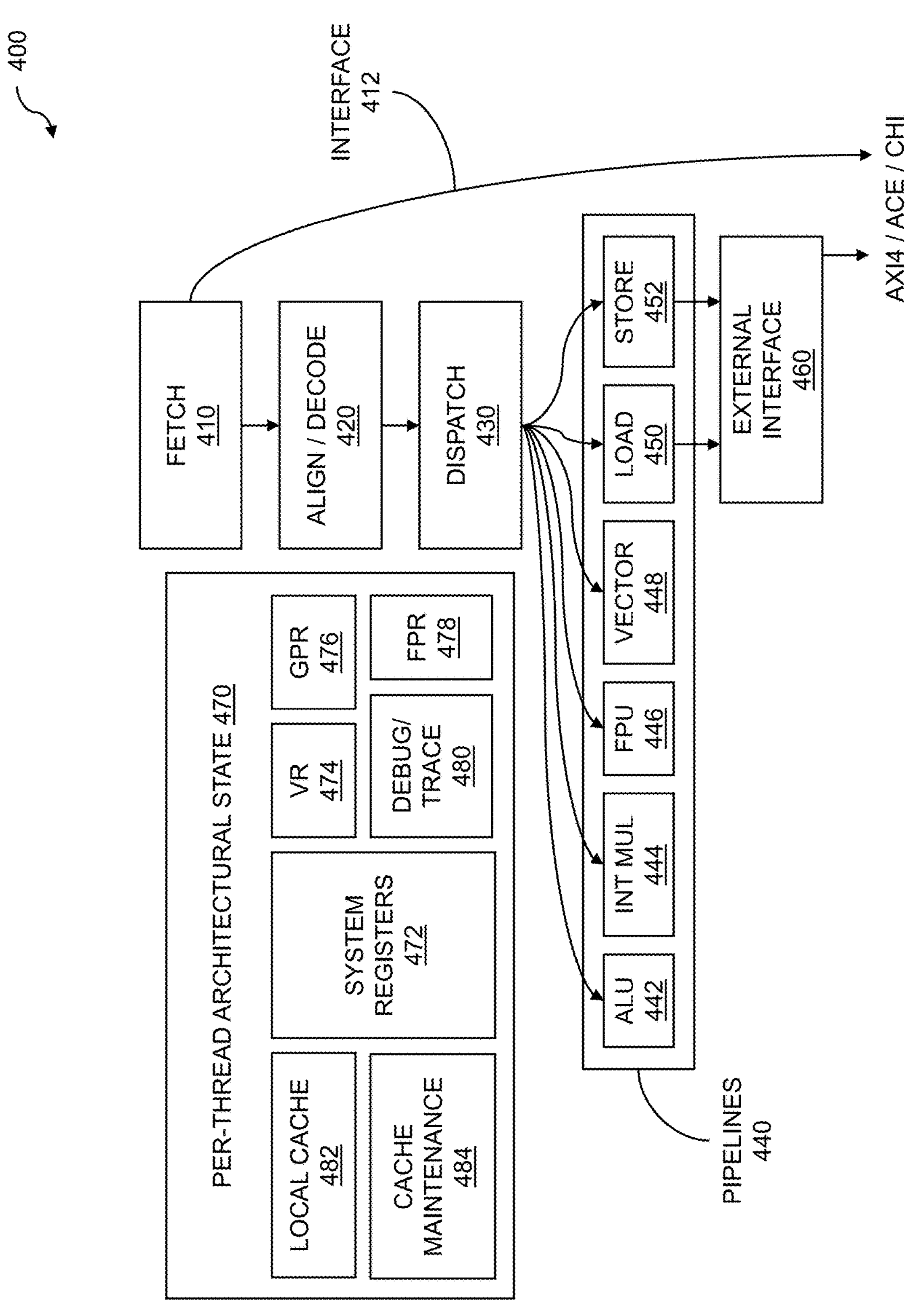
FIG. 4 is a block diagram for a pipeline.

FIG. 4 is a block diagram 400 for a pipeline. The use of one or more pipelines associated with a processor architecture can greatly enhance processing throughput. The processor architecture can be associated with one or more processor cores. The processing throughput can be increased because multiple operations can be executed in parallel. The use of one or more pipelines supports direct cache transfer with shared cache lines. A plurality of processor cores is accessed, wherein the plurality of processor cores comprises a coherency domain, and wherein two or more processor cores within the plurality of processor cores generate read operations for a shared memory structure coupled to the plurality of processor cores.

FIG. 4 shows a block diagram of a pipeline such as a processor core pipeline. The blocks within the block diagram can be configurable in order to provide varying processing levels. The varying processing levels can be based on processing speed, bit lengths, and so on. The block diagram 400 can include a fetch block 410. The fetch block 410 can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 412. The interface can include a standard interface such as one or more industry standard interfaces. The interfaces can include an Advanced eXtensible Interface (AXI™), an ARM™ Advanced eXtensible Interface (AXI™) Coherence Extensions (ACE™) interface, an Advanced Microcontroller Bus Architecture (AMBA™) Coherence Hub Interface (CHI™), etc.

The block diagram 400 includes an align and decode block 420. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decoded packets. The decoded packets can be used in the pipeline to manage execution of operations. The block diagram 400 can include a dispatch block 430. The dispatch block can receive decoded instruction packets from the align and decode block. The decoded instruction packets can be used to control a pipeline 440, where the pipeline can include an in-order pipeline, an out-of-order (OoO) pipeline, etc. A pipeline can be associated with the one or more execution units. The pipelines associated with the execution units can include processor cores, arithmetic logic unit (ALU) pipelines 442, integer multiplier pipelines 444, floating-point unit (FPU) pipelines 446, vector unit (VU) pipelines 448, and so on. The dispatch unit can further dispatch instructions to pipelines that can include load pipelines 450, and store pipelines 452. The load pipelines and the store pipelines can access storage such as the common memory using an external interface 460. The external interface can be based on one or more interface standards such as the Advanced eXtensible Interface (AXI™). Following execution of the instructions, further instructions can update the register state. Other operations can be performed based on actions that can be associated with a particular architecture. The actions that can be performed can include executing instructions to update the system register state, trigger one or more exceptions, and so on.

In embodiments, the plurality of processors can be configured to support multi-threading. The system block diagram can include a per-thread architectural state block 470. The inclusion of the per-thread architectural state can be based on a configuration or architecture that can support multi-threading. In embodiments, thread selection logic can be included in the fetch and dispatch blocks discussed above. Further, when an architecture supports an out-of-order (OoO) pipeline, then a retire component (not shown) can also include thread selection logic. The per-thread architectural state can include system registers 472. The system registers can be associated with individual processors, a system comprising multiple processors, and so on. The system registers can include exception and interrupt components, counters, etc. The per-thread architectural state can include further registers such as vector registers (VR) 474, general purpose registers (GPR) 476, and floating-point registers 478. These registers can be used for vector operations, general purpose (e.g., integer) operations, and floating-point operations, respectively. The per-thread architectural state can include a debug and trace block 480. The debug and trace block can enable debug and trace operations to support code development, troubleshooting, and so on. In embodiments, an external debugger can communicate with a processor through a debugging interface such as a joint test action group (JTAG) interface. The per-thread architectural state can include a local cache state 482. The architectural state can include one or more states associated with a local cache such as a local cache coupled to a grouping of two or more processors. The local cache state can include clean or dirty, zeroed, flushed, invalid, and so on. The per-thread architectural state can include a cache maintenance state 484. The cache maintenance state can include maintenance needed, maintenance pending, and maintenance complete states, etc.

Figure 5:
FIG. 5 is a system block diagram of a multicore processor with a compute coherency block (CCB).
Figure 5:
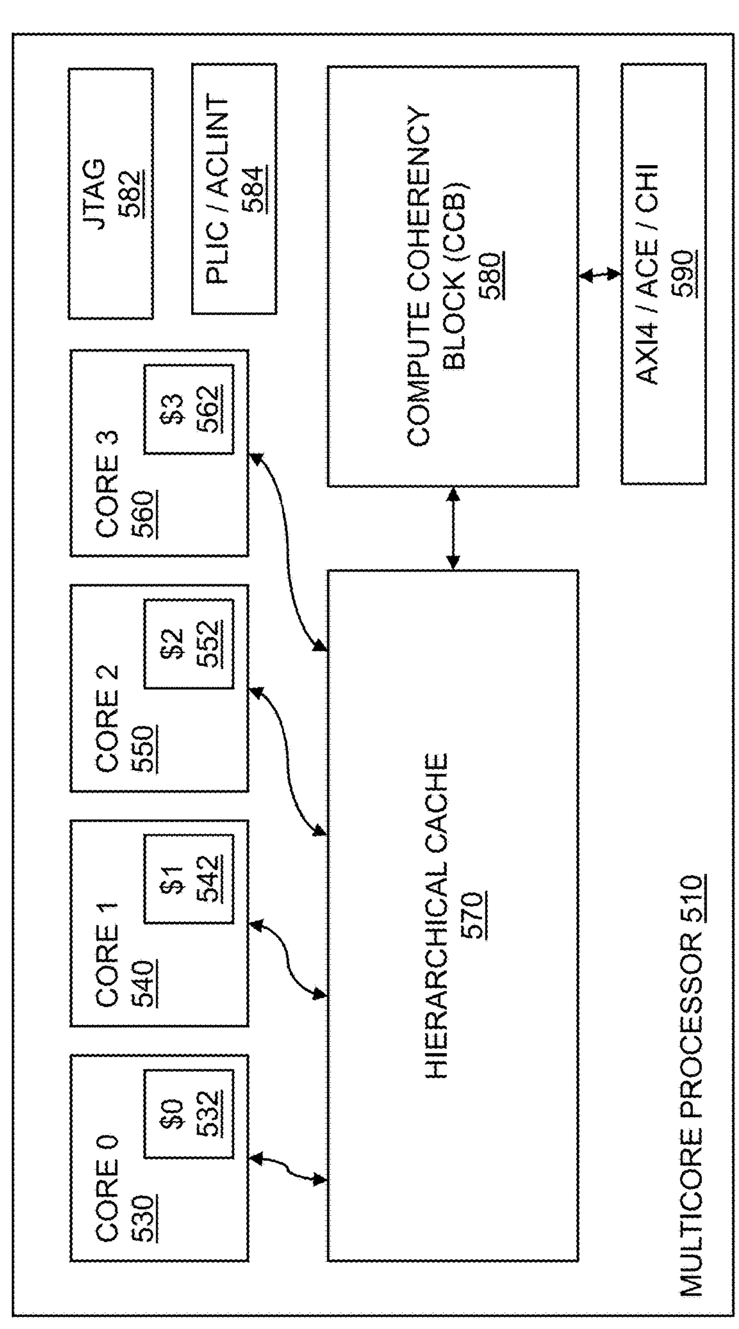

FIG. 5 is a system block diagram 500 showing a multicore processor 510 that includes a compute coherency block (CCB) 580. Multicore processor 510 includes core 0 530, core 1 540, core 2 550, and core 3 560. While four cores are shown in system block diagram 500, in practice, there can be more or fewer cores. As an example, disclosed embodiments can include 16, 32, or 64 cores. Each core comprises an onboard local cache, which is referred to as a level 1 (L1) cache. Core 0 530 includes local cache 532, core 1 540 includes local cache 542, core 2 550 includes local cache 552, and core 3 560 includes local cache 562.

The multicore processor 510 can further include a joint test action group (JTAG) element 582. The JTAG element 582 can be used to support diagnostics and debugging of programs and/or applications executing on the multicore processor 510 by providing access to the processor's internal registers, memory, and other resources. In embodiments, the JTAG element 582 enables functionality for step-by-step execution, setting breakpoints, examining the processor's state during program execution, and/or other relevant functions. The multicore processor 510 can further include a PLIC/ACLINT element 584. As stated previously, the PLIC (a platform level interrupt controller), and/or ACLINT (advanced core local interrupter) support features including, but not limited to, interrupt processing and timer functionalities. The multicore processor 510 can further include a hierarchical cache 570. The hierarchical cache 570 can be a level 2 (L2) cache that is shared among multiple cores within multicore processor 510. In one or more embodiments, the hierarchical cache 570 is a last level cache (LLC). The multicore processor 510 can further include one or more interface elements 590, which can include standard processor interfaces such as an Advanced eXtensible Interface (AXI™) such as AXI4™, an ARM™ Advanced eXtensible Interface (AXI™) Coherence Extensions (ACE™) interface, an Advanced Microcontroller Bus Architecture (AMBA™) Coherence Hub Interface (CHI™), as previously described.

Multicore processor 510 further includes a compute coherency block (CCB) 580. In one or more embodiments, the compute coherency block (CCB) 580 is responsible for maintaining coherency between one or more caches such as local caches associated with the processor cores and the shared memory system. In embodiments, the CCB 580 interfaces to the hierarchical cache 570 and the interface elements 590. The compute coherency block can perform one or more cache maintenance operations such as writing back "dirty" data in one or more caches or memory. The dirty data can result from changes to the local copies of shared memory contents in the local caches. The changes to the local copies of data can result from processing operations performed by the processor cores as the cores executing code. Similarly, data in the shared memory can be different from the data in a local cache due to an operation such as a write operation.

In the system block diagram 500, the compute coherency block (CCB) 580 can interface with a DSF. In embodiments, the snoop requests can be based on physical addresses for the shared memory structure. The CCB 580 can perform the functions associated with transferring cache ownership, and/or initiating direct cache transfers (DCTs) in accordance with disclosed embodiments. The physical addresses can include absolute, relative, offset, etc. addresses in the shared memory structure. In embodiments, the DSF can include a two-dimensional matrix, in which each column of the two-dimensional matrix can be headed by a unique physical address corresponding to a particular snoop request. The physical address can correspond to one or more read operations generated by one or more processors within the plurality of processor cores. In embodiments, an additional physical address can initialize an additional column to the two-dimensional matrix when the physical address is unique. The additional physical address can include a unique physical address within a cluster of addresses to be accessed by the plurality of processors. In other embodiments, an additional physical address can add an additional row to the two-dimensional matrix when the physical address is non-unique. The adding the row indicates that an additional read operation has been generated by a processor core. A column within the two-dimensional matrix can comprise a "snoop chain," where the snoop chain can include a head or first snoop and a tail snoop. In embodiments, the additional row can comprise the tail of a snoop chain for each column of the two-dimensional matrix. In one or more embodiments, the CCB 580 communicates with a home node that includes a DSF to orchestrate direct cache transfers between one or more cores within a plurality of multicore processors within an SOC. In embodiments, an SOC can include coherent request nodes that include the functional blocks shown in FIG. 5. In embodiments, the first coherent request node comprises a plurality of processor cores and caches.

Figure 6:
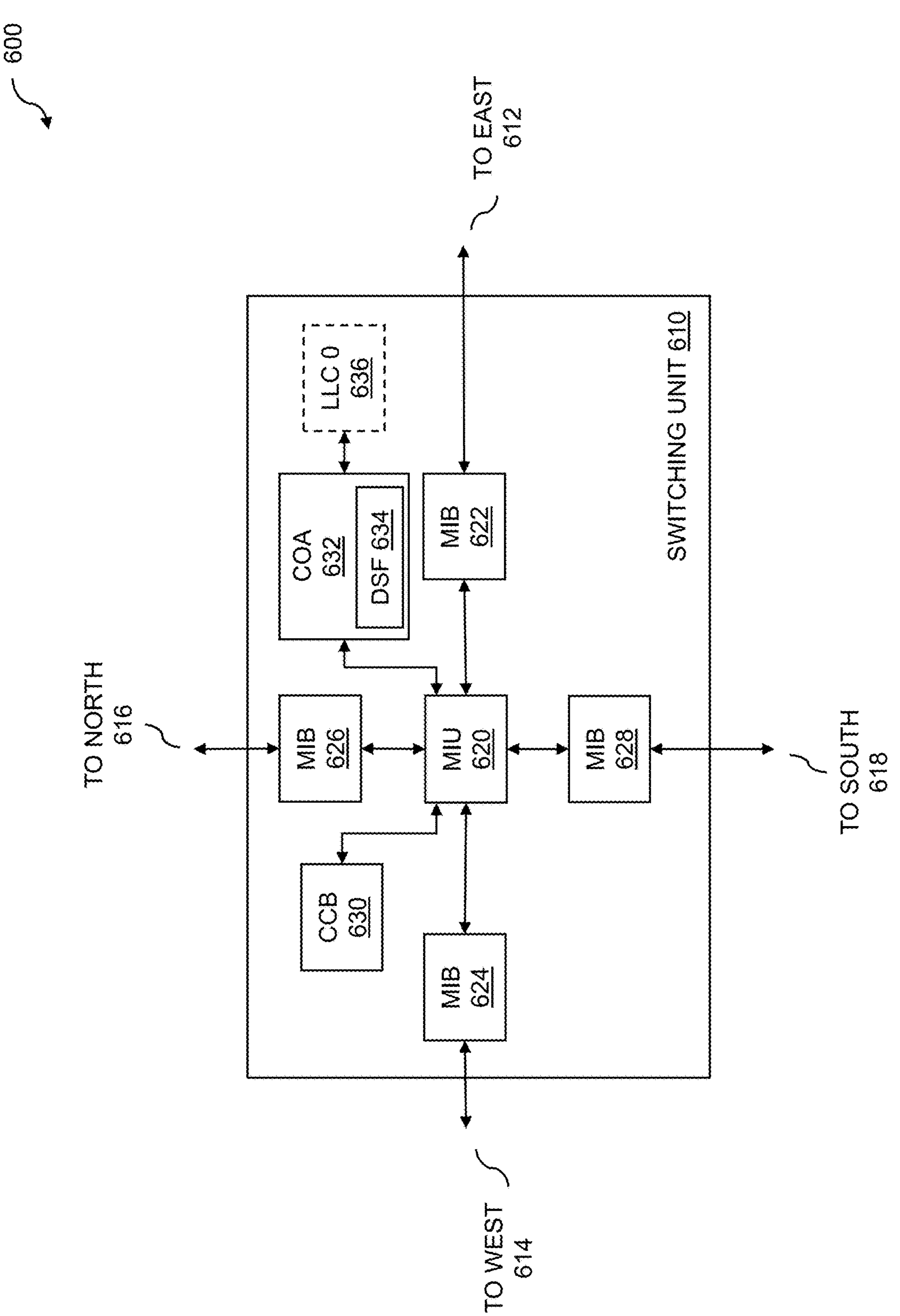
FIG. 6 is a switching unit for a mesh with a CCB and coherency ordering agent (COA).

FIG. 6 is a block diagram of a switching unit (SU) for a mesh with a CCB and COA. Discussed previously and throughout, a plurality of switching units can be configured in an M×N topology. The switching units can include one or more of a memory controller interface, an I/O mesh interface, and so on. An SU or tile can further include elements for managing coherency across the M×N topology. The various elements of a switching unit support multi-cast snoop vectors within a mesh topology. A snoop operation can be initiated by a first coherent tile within the M×N mesh topology. A snoop vector can be generated by the first coherent tile, wherein the snoop vector indicates one or more other tiles within the M×N mesh topology to be notified of the snoop operation. One or more targeted multi-cast snoop vectors and/or coarse multi-cast snoop vectors are created by the first coherent tile based on information in a DSF, and are used for sending snoop operation data to one or more other coherent tiles.

A mesh topology can include M×N elements in a mesh, grid, fabric, or other suitable topology. The M×N elements, which can be referred to generically as tiles associated with the mesh topology, can include elements based on a variety of configurations that perform a variety of operations, and so on. The tiles have been described as switching units (SUs), where the switching units can communicate with their nearest neighbor SUs that are located in cardinal directions from each SU. A given SU can be configured to perform one or more operations. Each SU can include one or more elements. An SU can be configured as a coherent mesh unit (CMU), a memory controller interface (MCI), an I/O control interface (ICI), and so on. A block diagram of a switching unit 600 is shown. The SU can be configured to enable coherency management. The switching unit (SU) 610 can communicate with nearest neighbor SUs that are located in cardinal directions from the SU 610. The nearest neighbor communications can include cardinal directions to the east 612, to the west 614, to the north 616, and to the south 618. The cardinal directions can be prioritized. In embodiments, the cardinal direction priority can be east/west, then north/south.

In embodiments, the switching unit 610 comprises a coherent tile. The coherent tile can include a compute coherency block (CCB) 630. The CCB 630 can include elements such as processor cores, local cache memory, shared cache memory, intermediate memories, and so on. The CCB 630 can manage coherency for the processor cores, local caches, and so on which are within the CCB. In embodiments, a coherent tile can also include a coherency ordering agent (COA) such as a COA 632. The COA 632 can be used to maintain coherency with other tiles inside the M×N mesh. A CCB and COA can be included in one or more coherent tiles of switching units within the M×N mesh.

The COA 632 can be used to order cache accesses based on an address to be accessed. The address can include a target address associated with a memory load operation or a memory store operation. The COA 632 can include a directory-based snoop filter (DSF) such as DSF 634. The DSF 634 can be used to determine the current owner of a block of memory within the system. The DSF 634 can also determine the sharers of a block of memory within the system. The DSF can store information pertaining to a specific address range. In that case, multiple DSFs can be used throughout the M×N mesh, each responsible for recording owner and sharer information for a specific address range. In embodiments, the DSF 634 can include an M-way associative set of tables that includes an index number, a valid bit, a presence vector, an owner ID field, an owner valid field, and so on. The COA 632 can be used to determine which cache to access. The cache can include a last level cache such as last level cache (LLC) 0 636. The LLC can be accessible by two or more of the switching units within the M×N mesh, a plurality of M×N meshes, and so on. The LLC can include a cache between the M×N mesh and a shared memory such as a shared system memory.

The switching unit 610 can include a mesh interface unit (MIU) 620. In embodiments, the MIU 620 can communicate with other MIUs from other SUs. The communications can take place in a cardinal direction from SU 610. In a usage example, the CCB 630 can initiate a snoop operation. The snoop operation can be associated with a memory access operation such as a read (load), write (store), read-modify-write, and so on. The COA 632 can then determine which other MIUs in the M×N mesh need to receive the snoop information. The snoop information can be based on data stored in the DSF 634. The DSF 634 can keep track of all the owners and sharers of cache lines in the system. Alternatively, the DSF 634 can keep track of all owners and sharers of cache lines within an address range in the system. Once the snoop information is determined, the MIU can communicate the snoop information to the necessary other SUs in the M×N mesh. The communication can be based on a snoop vector. The snoop vector can include one or more other tiles within the M×N mesh topology to be notified of the snoop operation. The MIU can communicate with other MIUs associated with other SUs using one or more interfaces, such as a mesh interface block. The other SUs can be located in cardinal directions from the SU 610. The switching unit 610 can include one or more mesh interface blocks (MIBs). The SU shown can include four MIBs such as MIB 622, MIB 624, MIB 626, and MIB 628. MIB 622 can enable communication to the east, MIB 624 can enable communication to the west, MIB 626 can enable communication to the north, and MIB 628 can enable communication to the south.

Figure 7:
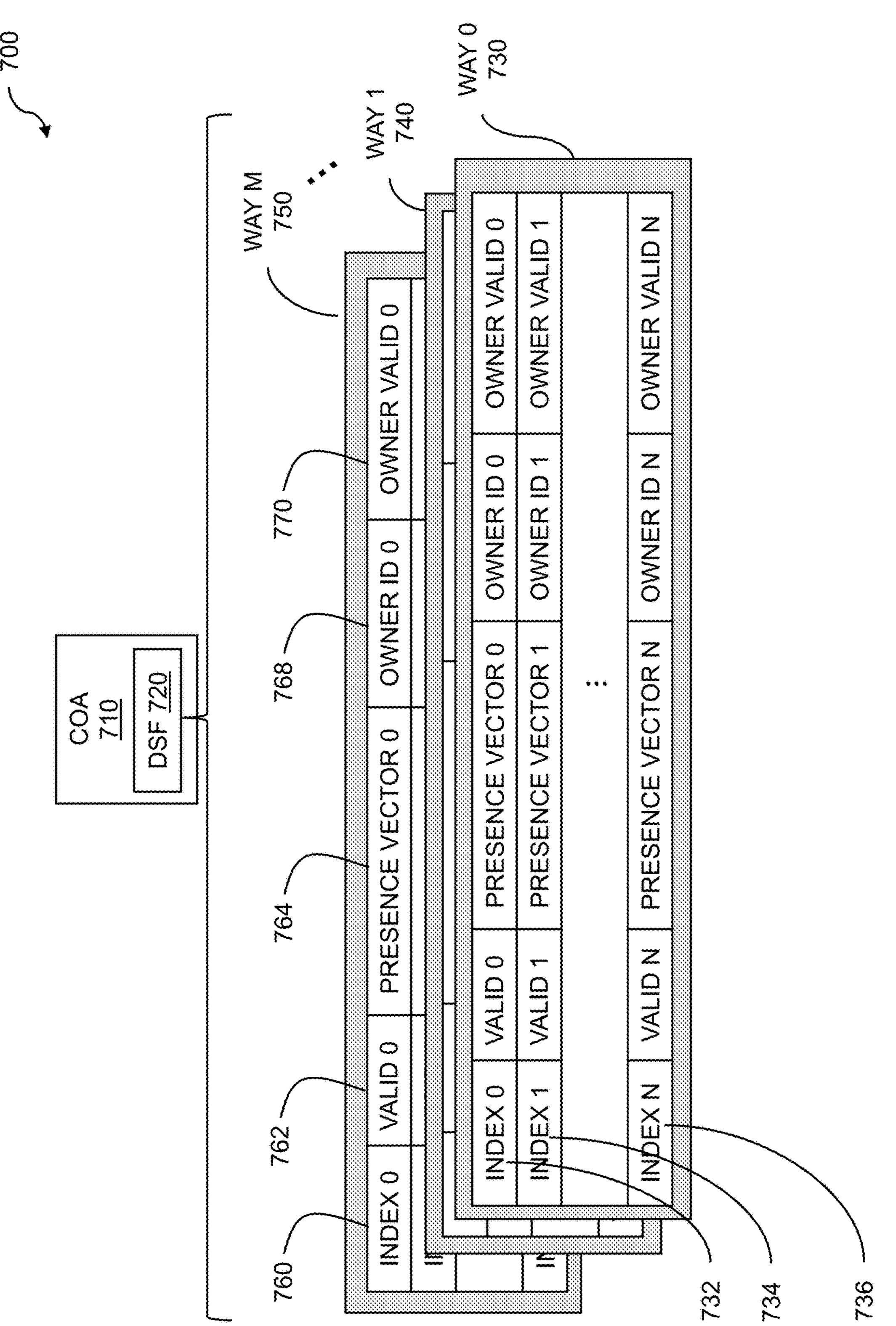
FIG. 7 is a block diagram for a directory snoop filter (DSF).

FIG. 7 is a block diagram for a directory-based snoop filter (DSF). In the block diagram 700, a coherency ordering agent (COA) 710 includes a DSF 720. The DSF 720 can include an M-way associative table that contains M entries. As depicted block diagram 700, there is shown way 0 730, way 1 740, and way M 750. In one or more embodiments, the value of M can be in the range from 2-64. Other values of M are possible in disclosed embodiments. Each way includes a plurality of columns. Column 760 includes an index value. The index value provides a mechanism for identifying a given row within the DSF 720. Column 762 includes a valid indicator for a given row within the DSF 720. In one or more embodiments, when the valid indicator indicates an invalid entry, the corresponding row is deemed to be available for writing a new entry. Column 764 includes a presence vector. A presence vector can include data for owners and sharers of one or more coherent cache lines. In one or more embodiments, the presence vector can include a field of bits. The field of bits can include a bit per cache per core that is in the SOC as previously stated. Column 768 includes an owner identifier (ID). The owner ID can include a unique number corresponding to a core within a multicore processor and/or SOC. In one or more embodiments, the owner ID can be a bit field of 8 bits, 16 bits, or some other suitable length. Column 770 includes an owner valid bit. The owner valid bit can be an indication of whether a given core owns a cache line. Ownership of a cache line can allow certain privileges such as writing to a cache line. For certain operations, such as reading from a cache line, ownership may not be required. Disclosed embodiments may modify the owner ID field, and/or owner valid bit as part of transferring ownership of a cache line from one core to another core. As shown in way 0 730, there are multiple rows, and thus multiple index values, indicated as 732, 734, and 736. In one or more embodiments, to search within the DSF, disclosed embodiments utilize an index value to reference a desired entry in the DSF. In embodiments, the DSF includes owner and sharer information for each cache line within a hierarchical cache coupled to the first CCB. In embodiments, the N ways in the DSF are not equal to a number of ways, in a last level cache (LLC), within the first CCB.

Figure 8:
FIG. 8 is an example of an M×N mesh.
Figure 8:
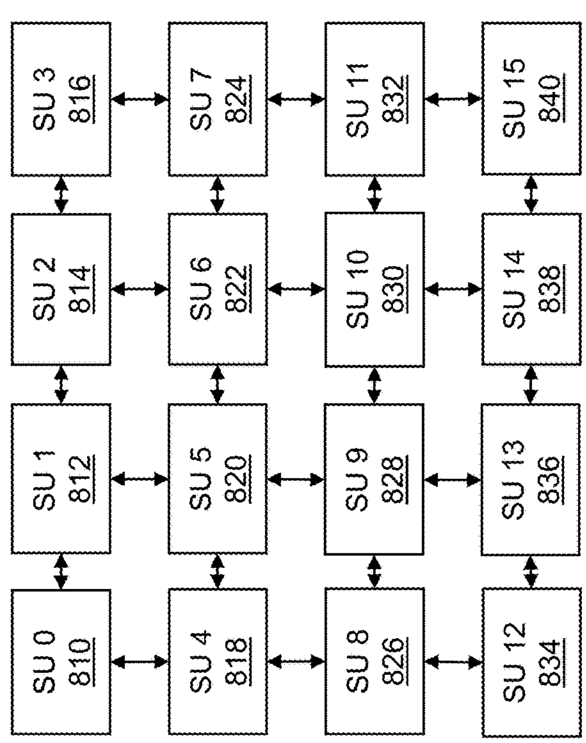

FIG. 8 is an example 4×4 mesh with regions. As discussed throughout, a multiple pass capacity miss process can be used to manage access to storage. The storage can include cache storage that is shared by coherent tiles associated with a system-on-a-chip (SOC). A snoop vector can be used to alert one or more other coherent tiles that a coherent tile is requesting access to an address in the shared cache storage. The access request can include a read request, a write request, a read-modify-write request, and so on. The coherent tiles can be configured within the SOC using a mesh topology. The coherent tiles can be switching units, where the switching units can include functions for routing snoop vectors to one or more tiles within the mesh topology that access the same shared storage address. The mesh topology is enabled by multi-cast snoop vectors. In embodiments, an SOC is accessed, where the SoC includes a network-on-a-chip (NOC), wherein the NOC includes an M×N mesh topology, wherein the M×N mesh topology includes a coherent tile at each point of the M×N mesh topology, and where a first coherent tile within the M×N mesh topology includes the first CCB and the first COA.

The coherent tiles can perform a variety of functions. In some embodiments, each coherent tile includes similar circuitry. In other embodiments, one or more coherent tiles with the M×N mesh may include different circuitry. As an example, some coherent tiles can include a CCB and a COA, whereas other coherent tiles can include input/output (I/O) control interfaces (ICIs). The SUs can include functions and/or instructions for routing snoop operations. The routing operations can be part of a packetized point-to-point communication protocol. The ICIs can support I/O operations to one or more peripherals within the SOC. Other types of coherent tiles can be included in one or more embodiments. In embodiments, the one or more other coherent tiles include one or more I/O control interfaces (ICIs).

A snoop operation can be initiated by a first coherent tile within the M×N mesh topology. A snoop vector can be generated by the first coherent tile, wherein the snoop vector indicates one or more other tiles within the M×N mesh topology to be notified of the snoop operation. One or more snoop vectors are created by the first coherent tile. The snoop vectors can be part of a multiple pass process for performing a read request and corresponding DSF eviction, based on information maintained within a directory-based snoop filter (DSF). In embodiments, the first coherent tile includes a compute coherency block (CCB) and a coherency ordering agent (COA).

As described above, the communication between switching units can be based on snoop vectors. In one or more embodiments, the communicating between switching units is further based on selecting an adjacent switching unit or coherent tile. The adjacent SU is located in a cardinal direction in relation to the first SU. The cardinal direction can include north, south, east, or west. The cardinal direction priority can be used to select which cardinal direction can be chosen for communicating a snoop operation. In embodiments, the cardinal direction priority can be east/west, then north/south. The example 800 shows a 4×4 mesh, comprising 16 switching units, indicated as SU 0 810, SU 1 812, SU 2 814, SU 3, 816, SU 4, 818, SU 5, 820, SU 6, 822, SU 7, 824, SU 8, 826, SU 9, 828, SU 10, 830, SU 11, 832, SU 12, 834, SU 13, 836, SU 14, 838, and SU 15, 840. Each SU can include a CCB, a COA, and a DSF, as depicted in FIG. 6.

While the example 800 shows 16 SUs arranged in a 4×4 mesh, other embodiments may have more or fewer SUs, and in some embodiments, the M×N mesh is configured such that M is equal to N, such as shown in FIG. 8. In some embodiments, M and N are unequal. In embodiments, the DSF includes owner and sharer information for each cache line within each hierarchical cache coupled to every CCB, within the one or more CCBs, that is coupled to the COA.

A system-on-chip (SOC) with multiple processing elements arranged in a mesh topology offers several advantages, especially in terms of parallel processing, communication efficiency, and overall system performance. Mesh topology allows for parallel processing, significantly enhancing the overall processing power and computational throughput of the SOC. Moreover, mesh architectures are inherently scalable. Additional processing elements can be easily added to the mesh, providing a straightforward way to increase the computational capacity of the SOC. This scalability is important for accommodating the growing demands of complex applications. Additionally, mesh topology provides fault tolerance. This improves the reliability and robustness of the SOC, ensuring that the system can continue to function even in the presence of hardware failures. However, a challenge with multiple processing elements working together is coherency of data, particularly with a hierarchical cache. Disclosed embodiments provide an access request process that includes a DSF eviction, based on capacity, when necessary. The access request is performed in multiple passes, performing a DSF eviction and creating an available slot in the DSF, then replaying an access request to populate the DSF with new data corresponding to the access request, thereby maintaining cache coherency and obtaining performance gains provided by a hierarchical cache, along with the other aforementioned benefits of processing elements arranged in a mesh topology.

Figure 9:
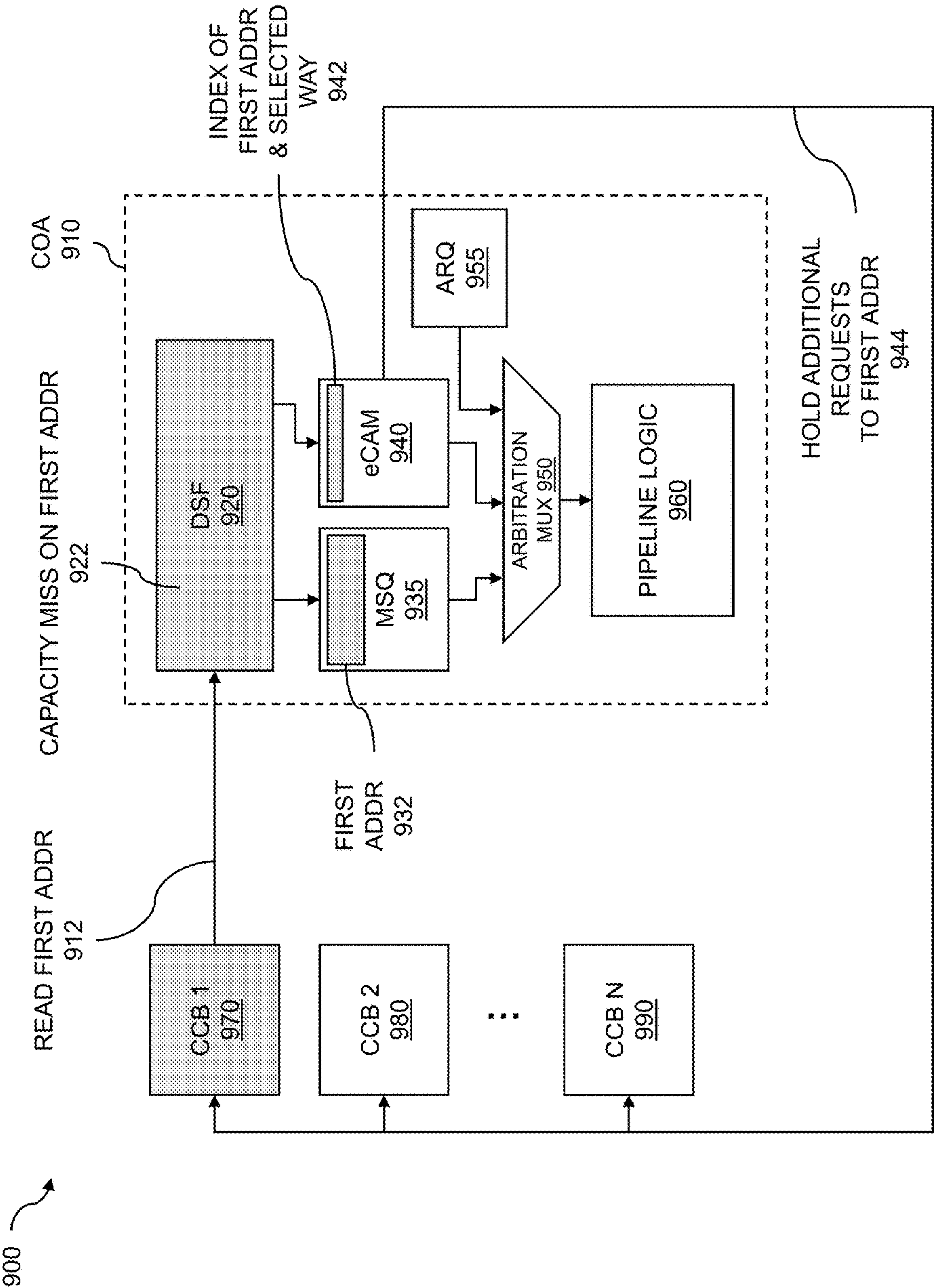
FIG. 9 is a block diagram of a first pass to handle a capacity miss in a DSF.

FIG. 9 is a block diagram of a first pass to handle a capacity miss in a DSF. The block diagram 900 includes multiple CCBs, indicated as CCB 1 970, CCB 2 980, and CCB N 990. While three CCB are illustrated in FIG. 9, in practice, there can be more or fewer CCBs. In embodiments, the CCBs can be located in different coherent tiles with an M×N mesh. Thus, in a case where M and N both equal 8, there can be up to 64 CCBs. In a case where M equals 16 and N equals 8, there can be 128 CCBs. Other mesh sizes and numbers of CCBs are possible in disclosed embodiments. As per block diagram 900, CCB 1 970 issues a read request of a first address 912. The read request of the first address 912 is handled by a particular COA 910 within the mesh. The COA 910 may reside in the same coherent tile as CCB 1 970, or it can reside on another coherent tile within the mesh. In one or more embodiments, COA 910 can manage the first read address 912 requested by CCB 1 970. The COA 910 can further identify the corresponding coherent tile (switching unit) to which the read request is sent. In FIG. 9, the read request of the first address 912 is directed to the DSF 920 within COA 910. A capacity miss on the first address 922 occurs. A capacity miss is a special type of miss in that not only is the data corresponding to the first address not currently in the DSF, but additionally, there is currently no available slot (way) to place an entry for the first read address. Disclosed embodiments handle the capacity miss using a multiple pass process that includes a DSF eviction. FIG. 9 illustrates the first pass of the multiple pass process. The COA 910 first selects a slot (way) to be evicted. In one or more embodiments, the eviction can be based on a pseudorandom selection, a least recently used (LRU) algorithm, or another suitable algorithm. The index of the first address, along with the selected way 942 is stored in eCAM 940. Additionally, the first address 932 is stored in MSQ 935. In subsequent passes, information in the eCAM 940 and MSQ 935 are fed to the pipeline logic 960 via arbitration mux 950. Note that additional access requests to the first address are being held 944 at this point in time. In embodiments, the COA processes one or more incoming requests received on the M×N mesh topology. In one or more embodiments, additional access requests that arrive while the multiple pass capacity miss process is in progress may be stored in a queue within the COA 910, such as the MSQ, or another queue dedicated for that purpose, such as additional request queue (ARQ) 955. In one or more embodiments, once the multiple pass capacity miss process is completed, additional requests in ARQ 955 may be processed. The ARQ can be an input FIFO. Embodiments can include saving, to an input FIFO within the COA, the another request to the first address. In embodiments, the initiating, the selecting, and the saving comprise a first COA pipeline pass.

Figure 10:
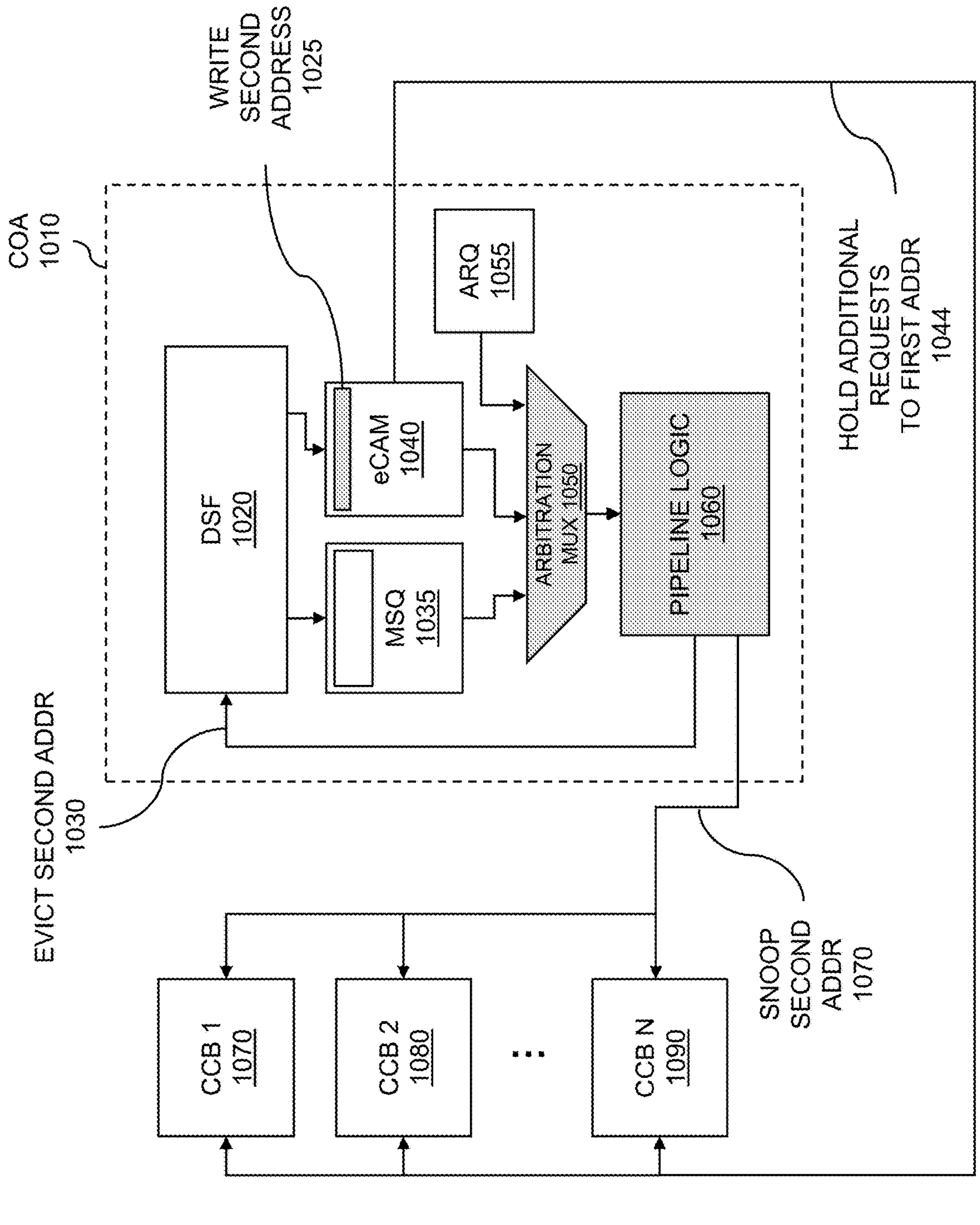
FIG. 10 is a block diagram of a second pass to handle a capacity miss in a DSF.

FIG. 10 is a block diagram of a second pass to handle a capacity miss in a DSF. Continuing the example started in FIG. 9, block diagram 1000 illustrates a second pass of the multiple pass capacity miss process, with each block being shown at a later point in time than is being shown in FIG. 9. The block diagram 1000 includes multiple CCBs, indicated as CCB 1 1070, CCB 2 1080, and CCB N 1090. In the block diagram 1000, in the second pass, the eCAM 1040 arbitrates for access to the pipeline logic 1060 via arbitration mux 1050. The arbitrating can include sending the entry in the eCAM 1040, where the entry includes the index of the first address and selected way. The arbitration mux 1050 also includes an input from ARQ 1055 and MSQ 1035, discussed above and below, which is not needed for this pass. The pipeline logic 1060 can perform an eviction of the entry in the DSF 1020 that corresponds to the index of the first address and selected way (indicated by 942 of FIG. 9) that was stored in eCAM 1040. The eviction can include invalidating one or more fields within an entry, such as indicated in FIG. 7. The invalidating can include setting a valid bit to zero, setting an owner valid bit to zero, and/or setting of other fields accordingly. The information that is evicted from the DSF corresponds to a second address. The second address had been associated with the DSF due to a previous access request of the second address. In the second pass, as depicted in FIG. 10, the COA evicts the second address 1030. To maintain cache coherency within the mesh of coherent tiles, the pipeline logic 1060 of COA 1010 issues a snoop of the second address 1070. The snoop can cause any CCB that has dirty data (data in cache that has not yet been flushed to main memory) to be written to main memory and/or one or more levels or a hierarchical cache (e.g., 570 of FIG. 5). In embodiments, the snoop forces one or more sharers of the second address to back invalidate a shared cache line corresponding to the second address. Additionally, the COA 1010 writes the second address 1025 in the eCAM 1040. The presence of the second address in the eCAM 1040 can serve as another criterion to hold additional access requests to the first address 1044. The additional access requests can come from one or more CCBs within the N×M mesh. Thus, embodiments can include receiving, from the one or more CCBs, one or more responses to the snoop of the second address. Additionally, embodiments can include holding another request to the first address from the one or more CCBs, wherein the holding is based on the second address that was written into the eCAM. In embodiments, the arbitrating and the sending comprise a second COA pipeline pass.

Figure 11:
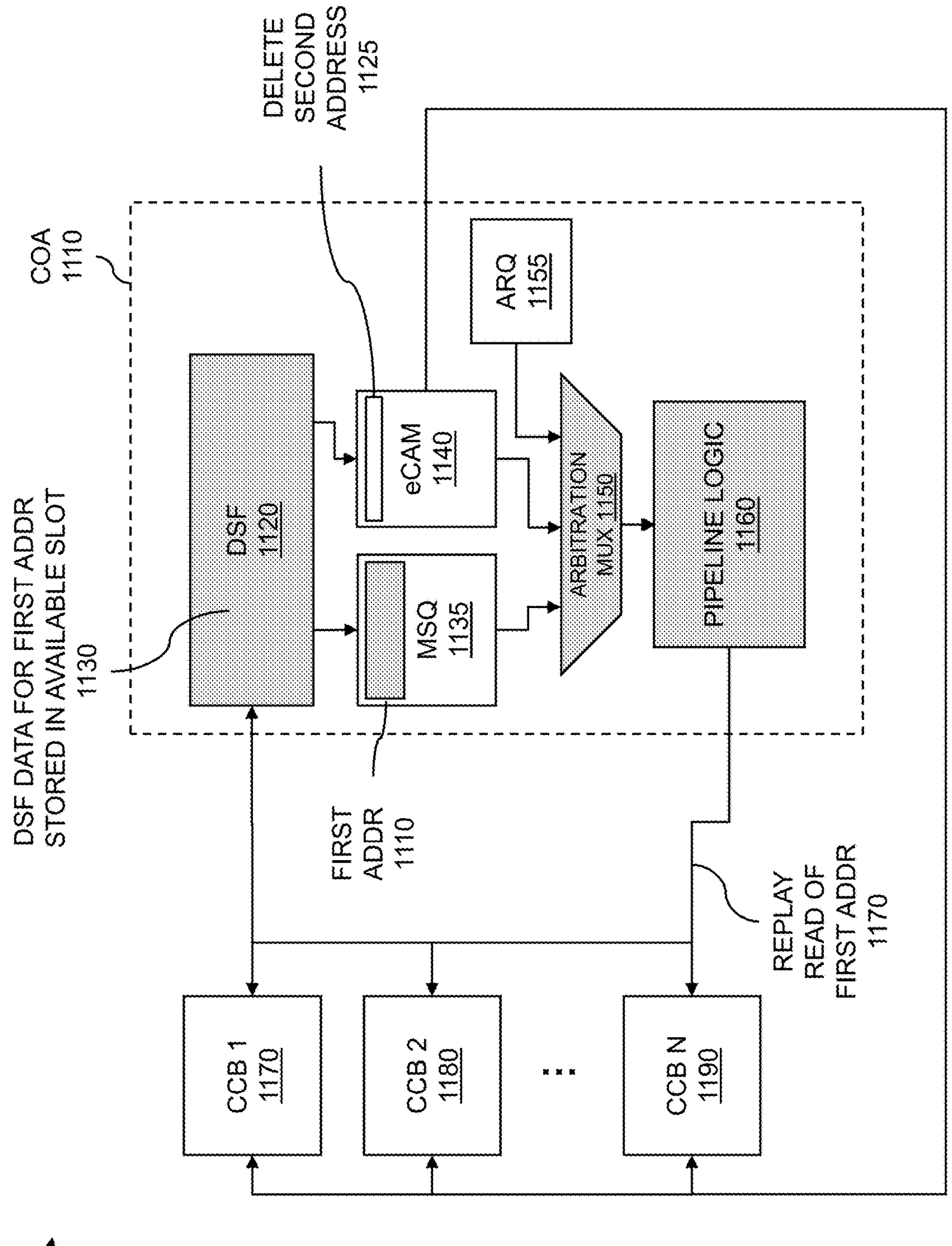
FIG. 11 is a block diagram of a third pass to handle a capacity miss in a DSF.

FIG. 11 is a block diagram of a third pass to handle a capacity miss in a DSF. Continuing the example started in FIG. 9 and continued in FIG. 10, diagram 1100 illustrates a third pass of the multiple pass capacity miss process, with each block being shown at a later point in time than is being shown in FIG. 10. The block diagram 1100 includes multiple CCBs, indicated as CCB 1 1170, CCB 2 1180, and CCB N 1190. With the eviction of the entry in the DSF 1120 complete, the read request that was originally attempted at 912 of FIG. 9 can now be re-attempted by replaying the read of the first address 1110. Note that at this point, the first address is stored in the MSQ 1135 and the second address is stored in the eCAM 1140. While both addresses are stored, additional accesses to either address can be blocked by the COA 1110 and held for future processing. The replaying is enabled by the MSQ 1135. The MSQ 1135 accesses the pipeline logic 1160 via arbitration mux 1150. The first address (from the read request at 912 of FIG. 9) is replayed 1170. The replaying includes providing the read request of the first address back into the DSF 1120. In this third pass, the eviction shown and described via FIG. 10 has completed, and there is now an available entry to store DSF information pertaining to the first address. The DSF data for the first address is stored in the available slot 1130 that resulted from the DSF eviction.

Upon updating the DSF 1120 with information pertaining to the first address, the COA 1110 can delete the second address 1125 in the eCAM. The deleting of the second address can include writing a value, such as a null value, to the location in eCAM 1140 that was storing the second address. Once the second address is deleted from the eCAM, the COA can allow additional accesses to the second address to occur. Embodiments can include allowing another request, from the one or more CCBs, to the first address, wherein the allowing is based on deleting the entry of the eCAM. Thus, with the second address deleted, the hold of additional requests to the first address (944 of FIG. 9) is released. The hold of additional requests to the second address can also be released. Embodiments can include allowing another request, from the one or more CCBs, to the first address, wherein the allowing is based on deleting the second address that was written to the eCAM. Any additional requests that had arrived while the multiple pass capacity miss process was in progress, and were stored in the ARQ 1155, can be awakened, and input to the pipeline logic 1160 via arbitration mux 1150, in order to be processed. Thus, embodiments can include awakening the another request, wherein the awakening is based on deleting the second address that was written to the eCAM. In this way, cache coherency is maintained, and access requests that arrived while the multiple pass capacity miss process was in progress can be processed. In embodiments, the replaying includes searching the DSF for the first address, wherein the searching produces a miss, and wherein the DSF saves information corresponding to the first address at a location, in the DSF, previously occupied by the second address. In embodiments, the mediating and the starting comprise a third COA pipeline pass. The MSQ 1135, eCAM 1140, and ARQ 1155 serve to record information pertaining to an access request and DSF eviction. By recording this information in these elements, the need to track DSF evictions within the pipeline logic 1160 is eliminated, thereby saving considerable gates, and therefore, achieving an efficiency boost, as well as reducing the die area required for physical implementation.

Figure 12:
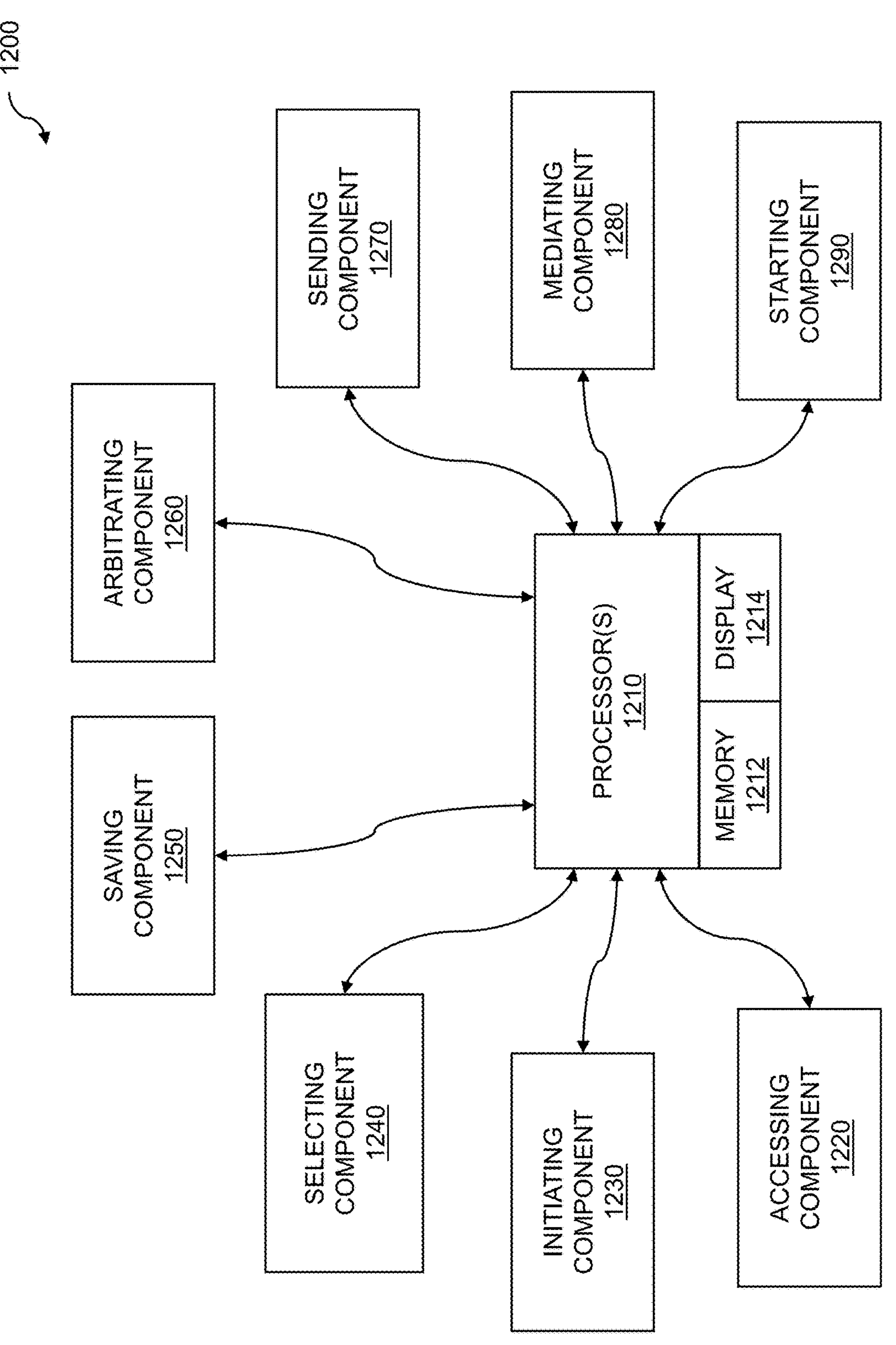
FIG. 12 is a system diagram for processing cache evictions in a directory snoop filter with eCAM.

FIG. 12 is a system diagram for processing cache evictions in a directory snoop filter with eCAM. The system 1200 can comprise a processor-implemented system for sharing data. The computer system can be based on semiconductor logic. The system can include one or more of processors, memories, cache memories, queues, displays, and so on. The processors can include standalone processors within integrated circuits or chips, processor cores in FPGAs or ASICs, two or more processor cores within a multiprocessor, and so on. The one or more processors 1210 are coupled to a memory 1212, which stores instructions, operations, snoop vectors, local snoop vectors, directional snoop vectors, and so on. The memory can include one or more of local memory, shared cache memory, shared hierarchical cache memory, system memory such as shared system memory, etc. The system 1200 can further include a display 1214 coupled to the one or more processors 1210. The display 1214 can be used for displaying data, instructions, operations, memory queue contents, various types of vectors, and the like. The operations can include snoop operations and snoop operation responses. The operations can further include cache maintenance operations, Advanced eXtensible Interface (AXI™) Coherence Extensions (ACE™) cache transactions, Advanced Microcontroller Bus Architecture (AMBA™) Coherence Hub Interface (CHI™) transactions, etc.

The system 1200 can include an accessing component 1220. The accessing component 1220 can include functions and instructions to enable accessing a system-on-a-chip (SOC). An SOC can include a variety of elements associated with a computing system such as one or more processor cores, input/output interfaces, local memory, memory interfaces, secondary memory interfaces, and so on. The SOC can further include elements such as radio frequency (RF) components, graphics processors, network-on-a-chip (NOC) connectivity, etc. The SOC can be based on one or more chips, FPGAs, ASICs, etc. In embodiments, the processor cores associated with the SOC can include RISC-V™ processor cores. Memory such as local memory within the SOCs includes a local cache. The local cache can include a shared local cache. The shared local cache can be colocated with other elements associated with the SOC, can be accessible by a processor core within the SOC, and so on. The processor cores can implement special cache coherency operations. The cache coherency operations can include maintenance operations such as cache maintenance operations (CMOs). The cache coherency operations can include a cache line zeroing operation, a cache line cleaning operation, a cache line flushing operation, a cache line invalidating operation, and so on.

A plurality of processor cores and coupled local caches within an SOC can include a coherency domain. The coherency can include coherency between the common memory and cache memory, such as level 1 (L1) cache memory. L1 cache memory can include a local cache coupled to groupings of two or more processor cores. The coherency between the common memory and one or more local cache memories can be accomplished using cache maintenance operations (CMOs), described previously. In embodiments, two or more processor cores can generate read operations for a common memory structure. The read operations for the common memory can occur based on cache misses to local cache, thereby requiring the read operations to be generated for the common memory. In embodiments, each processor core within the SOC can access a common memory structure. The access to the common memory structure can be accomplished through a coherent network-on-chip. The common memory can include on-chip memory, off-chip memory, etc. The coherent network-on-chip comprises a global coherency that can accommodate a capacity miss in a directory snoop filter (DSF).

The system 1200 can include an initiating component 1230. The initiating component 1230 can include functions and instructions for initiating, by a first CCB in the one or more CCBs, a read request to a first address, where the first address includes a first index, where the read request misses in the DSF, and where the DSF is occupied with valid data at each way of the N ways corresponding to the first index. The initiating can be part of an integer instruction, floating-point instruction, vector instruction, and/or other instruction types.

The system 1200 can include a selecting component 1240. The selecting component 1240 can include functions and instructions for selecting, by the DSF, a cache line for eviction, wherein the cache line includes the first index and a selected way within the N ways, wherein the first index and the selected way are stored in an entry within one or more entries of the eviction content addressable memory (eCAM). The selecting can be based on a round robin algorithm, first-in-first-out algorithm, least recently used (LRU) algorithm, and/or other suitable technique. In embodiments, the selecting is accomplished with a pseudorandom algorithm.

The system 1200 can include a saving component 1250. The saving component 1250 can include functions and instructions for saving a read request in a miss and snoop queue (MSQ). The MSQ can enable a multiple pass access request that accommodates DSF eviction when necessary. During a pass of the multiple pass access request, the saved read request is replayed into the pipeline logic, to enable the read request to be processed while maintaining cache coherency.

The system 1200 can include an arbitrating component 1260. The arbitrating component 1260 can include functions and instructions for arbitrating, by the eCAM, for the pipeline logic within the COA, where the arbitrating includes selecting, by the eCAM, the entry to send to the pipeline logic. The entry that is sent to the pipeline logic results in the eviction of a corresponding entry in the DSF, enabling a replay of the read request to have its corresponding entry stored in the DSF.

The system 1200 can include a sending component 1270. The sending component 1270 can include functions and instructions for sending, by the eCAM, to the pipeline logic, the entry, where the sending causes a cache line associated with the first index to be evicted from the DSF. The cache line is associated with a second address, where the sending includes writing, to the eCAM, by the DSF, the second address, where the second address overwrites the entry in the eCAM, and where the sending includes generating, by the pipeline logic, a snoop of the second address. The second address can be associated with the data that is being evicted from the DSF.

The system 1200 can include a mediating component 1280. The mediating component 1280 can include functions and instructions for mediating, by the MSQ, for the pipeline logic within the COA, where the mediating includes replaying, to the pipeline logic, by the MSQ, the read request to the first address. At the time the replaying is initiated, the DSF eviction has already taken place. In this way, during the replaying of the read request to the first address, an available slot is present in the DSF, thereby enabling the first read request to successfully complete, while taking advantage of the cache hierarchy for future read requests to the first address.

The system 1200 can include a starting component 1290. The starting component 1290 can include functions and instructions for starting, by the COA, the read request to the first address, where the read request to the first address is handled coherently. Thus, the system 1200 can serve to provide improved overall system performance and responsiveness by enabling faster access to frequently used data. Moreover, cache memory is generally faster than main memory, which helps reduce memory latency. By including frequently used data in cache, the CPU can access it quickly, minimizing delays. Additionally, accessing data from cache can require less energy compared to fetching data from main memory. By minimizing the need to access slower memory components, cache memory can contribute to reduced power consumption in the system. Furthermore, cache reduces the amount of data that needs to be transferred between the CPU and main memory over the system bus. This reduction in bus traffic can lead to improved overall system bandwidth and efficiency. Disclosed embodiments include a multiple pass capacity miss process that stores a read request, determines that a DSF miss occurred, and also determines that the DSF is currently full. The multiple pass capacity miss process saves the read request in a miss and snoop queue (MSQ), evicts an entry from the DSF, which frees a slot in the DSF, and then replays the read request through the pipeline logic, once the DSF eviction has completed. Thus, disclosed embodiments can improve the operation of computer systems, and particularly computer systems that include a mesh of coherent tiles, where each tile has a directory snoop filter (DSF).

The system 1200 can include a computer program product embodied in a non-transitory computer readable medium for sharing data, the computer program product comprising code which causes one or more processors to generate semiconductor logic for: accessing a system-on-a-chip (SOC), wherein the SOC includes one or more compute coherency blocks (CCBs) and one or more coherency ordering agents (COAs), wherein a first COA within the one or more COAs comprises a directory snoop filter (DSF), an eviction content addressable memory (eCAM), a miss and snoop queue (MSQ), and a pipeline logic, wherein the DSF comprises N ways; initiating, by a first CCB in the one or more CCBs, a read request to a first address, wherein the first address includes a first index, wherein the read request misses in the DSF, and wherein the DSF is occupied with a valid data at each way of the N ways corresponding to the first index; selecting, by the DSF, a cache line for eviction, wherein the cache line includes the first index and a selected way within the N ways, wherein the first index and the selected way are stored in an entry within one or more entries of the eCAM; saving the read request from the first CCB in the MSQ; arbitrating, by the eCAM, for the pipeline logic within the COA, wherein the arbitrating includes selecting, by the eCAM, the entry to send to the pipeline logic; sending, by the eCAM, to the pipeline logic, the entry, wherein the sending causes a cache line associated with the first index to be evicted from the DSF, wherein the cache line is associated with a second address, wherein the sending includes writing, to the eCAM, by the DSF, the second address, wherein the second address overwrites the entry in the eCAM, and wherein the sending includes generating, by the pipeline logic, a snoop of the second address; mediating, by the MSQ, for the pipeline logic within the COA, wherein the mediating includes replaying, to the pipeline logic, by the MSQ, the read request to the first address; and starting, by the COA, the read request to the first address, wherein the read request to the first address is handled coherently.

The system 1200 can include a computer system for sharing data comprising: a memory which stores instructions; one or more processors coupled to the memory wherein the one or more processors, when executing the instructions which are stored, are configured to: access a system-on-a-chip (SOC), wherein the SOC includes one or more compute coherency blocks (CCBs) and one or more coherency ordering agents (COAs), wherein a first COA within the one or more COAs comprises a directory snoop filter (DSF), an eviction content addressable memory (eCAM), a miss and snoop queue (MSQ), and a pipeline logic, wherein the DSF comprises N ways; initiate, by a first CCB in the one or more CCBs, a read request to a first address, wherein the first address includes a first index, wherein the read request misses in the DSF, and wherein the DSF is occupied with a valid data at each way of the N ways corresponding to the first index; select, by the DSF, a cache line for eviction, wherein the cache line includes the first index and a selected way within the N ways, wherein the first index and the selected way are stored in an entry within one or more entries of the eCAM; save the read request from the first CCB in the MSQ; arbitrate, by the eCAM, for the pipeline logic within the COA, wherein the arbitrating includes selecting, by the eCAM, the entry to send to the pipeline logic; send, by the eCAM, to the pipeline logic, the entry, wherein the sending causes a cache line associated with the first index to be evicted from the DSF, wherein the cache line is associated with a second address, wherein the sending includes writing, to the eCAM, by the DSF, the second address, wherein the second address overwrites the entry in the eCAM, and wherein the sending includes generating, by the pipeline logic, a snoop of the second address; mediate, by the MSQ, for the pipeline logic within the COA, wherein the mediating includes replaying, to the pipeline logic, by the MSQ, the read request to the first address; and start, by the COA, the read request to the first address, wherein the read request to the first address is handled coherently.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagram and flow diagram illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions generally referred to herein as a "circuit," "module," or "system" may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for sharing data comprising:

accessing a system-on-a-chip (SOC), wherein the SOC includes one or more compute coherency blocks (CCBs) and one or more coherency ordering agents (COAs), wherein a first COA within the one or more COAs comprises a directory snoop filter (DSF), an eviction content addressable memory (eCAM), a miss and snoop queue (MSQ), and a pipeline logic, wherein the DSF comprises N ways;

initiating, by a first CCB in the one or more CCBs, a read request to a first address, wherein the first address includes a first index, wherein the read request misses in the DSF, and wherein the DSF is occupied with a valid data at each way of the N ways corresponding to the first index;

selecting, by the DSF, a cache line for eviction, wherein the cache line includes the first index and a selected way within the N ways, wherein the first index and the selected way are stored in an entry within one or more entries of the eCAM;

saving the read request from the first CCB in the MSQ;

arbitrating, by the eCAM, for the pipeline logic within the COA, wherein the arbitrating includes selecting, by the eCAM, the entry to send to the pipeline logic;

sending, by the eCAM, to the pipeline logic, the entry, wherein the sending causes a cache line associated with the first index to be evicted from the DSF, wherein the cache line is associated with a second address, wherein the sending includes writing, to the eCAM, by the DSF, the second address, wherein the second address overwrites the entry in the eCAM, and wherein the sending includes generating, by the pipeline logic, a snoop of the second address;

mediating, by the MSQ, for the pipeline logic within the COA, wherein the mediating includes replaying, to the pipeline logic, by the MSQ, the read request to the first address; and starting, by the COA, the read request to the first address, wherein the read request to the first address is handled coherently.

2. The method of claim 1 wherein the replaying includes searching the DSF for the first address, wherein the searching produces a miss, and wherein the DSF saves information corresponding to the first address at a location, in the DSF, previously occupied by the second address.

3. The method of claim 1 wherein the selecting is accomplished with a pseudorandom algorithm.

4. The method of claim 1 further comprising holding another request to the first address from the one or more CCBs, wherein the holding is based on the second address that was written into the eCAM.

5. The method of claim 4 further comprising saving, to an input FIFO within the COA, the another request to the first address.

6. The method of claim 5 further comprising awakening the another request, wherein the awakening is based on deleting the second address that was written to the eCAM.

7. The method of claim 1 further comprising receiving, from the one or more CCBs, one or more responses to the snoop of the second address.

8. The method of claim 7 further comprising allowing another request, from the one or more CCBs, to the first address, wherein the allowing is based on deleting the entry of the eCAM.

9. The method of claim 7 further comprising writing back, by the one or more CCBs, a dirty cache line corresponding to the second address.

10. The method of claim 9 further comprising allowing another request, from the one or more CCBs, to the first address, wherein the allowing is based on deleting the second address that was written to the eCAM.

11. The method of claim 1 wherein the initiating, the selecting, and the saving comprise a first COA pipeline pass.

12. The method of claim 11 wherein the arbitrating and the sending comprise a second COA pipeline pass.

13. The method of claim 12 wherein the mediating and the starting comprise a third COA pipeline pass.

14. The method of claim 1 wherein the arbitrating includes a third address that was previously stored in the eCAM.

15. The method of claim 1 wherein the snoop causes an owner of a dirty cache line associated with the second address to perform a writeback to memory.

16. The method of claim 15 wherein the snoop forces one or more sharers of the second address to back invalidate a shared cache line corresponding to the second address.

17. The method of claim 1 wherein the DSF includes owner and sharer information for each cache line within a hierarchical cache coupled to the first CCB.

18. The method of claim 1 wherein the N ways in the DSF are not equal to a number of ways, in a last level cache (LLC) within the first CCB.

19. The method of claim 1 wherein the SOC includes a network-on-a-chip (NOC), wherein the NOC includes an M×N mesh topology, wherein the M×N mesh topology includes a coherent tile at each point of the M×N mesh topology, and wherein a first coherent tile within the M×N mesh topology includes the first CCB and the first COA.

20. The method of claim 19 wherein the first COA processes one or more incoming requests received on the M×N mesh topology.

21. The method of claim 19 wherein the DSF includes owner and sharer information for each cache line within each hierarchical cache coupled to every CCB, within the one or more CCBs, that is coupled to the COA.

22. A computer system for sharing data comprising:

a memory which stores instructions;

one or more processors coupled to the memory wherein the one or more processors, when executing the instructions which are stored, are configured to:

access a system-on-a-chip (SOC), wherein the SOC includes one or more compute coherency blocks (CCBs) and one or more coherency ordering agents (COAs), wherein a first COA within the one or more COAs comprises a directory snoop filter (DSF), an eviction content addressable memory (eCAM), a miss and snoop queue (MSQ), and a pipeline logic, wherein the DSF comprises N ways;

initiate, by a first CCB in the one or more CCBs, a read request to a first address, wherein the first address includes a first index, wherein the read request misses in the DSF, and wherein the DSF is occupied with a valid data at each way of the N ways corresponding to the first index;

select, by the DSF, a cache line for eviction, wherein the cache line includes the first index and a selected way within the N ways, wherein the first index and the selected way are stored in an entry within one or more entries of the eCAM;

save the read request from the first CCB in the MSQ;

arbitrate, by the eCAM, for the pipeline logic within the COA, wherein the arbitrating includes selecting, by the eCAM, the entry to send to the pipeline logic;

send, by the eCAM, to the pipeline logic, the entry, wherein the sending causes a cache line associated with the first index to be evicted from the DSF, wherein the cache line is associated with a second address, wherein the sending includes writing, to the eCAM, by the DSF, the second address, wherein the second address overwrites the entry in the eCAM, and wherein the sending includes generating, by the pipeline logic, a snoop of the second address;

mediate, by the MSQ, for the pipeline logic within the COA, wherein the mediating includes replaying, to the pipeline logic, by the MSQ, the read request to the first address; and start, by the COA, the read request to the first address, wherein the read request to the first address is handled coherently.

* * * * *